United States Patent
Hsieh et al.

(10) Patent No.: US 10,732,495 B2
(45) Date of Patent: *Aug. 4, 2020

(54) ILLUMINATION SYSTEM, PROJECTION APPARATUS AND METHOD FOR DRIVING ILLUMINATION SYSTEM

(71) Applicant: Coretronic Corporation, Hsin-Chu (TW)

(72) Inventors: Chi-Tang Hsieh, Hsin-Chu (TW);
Ko-Shun Chen, Hsin-Chu (TW);
Chi-Hsun Wang, Hsin-Chu (TW);
Hao-Wei Chiu, Hsin-Chu (TW);
Hou-Sheng Wang, Hsin-Chu (TW);
Chien-Chung Liao, Hsin-Chu (TW);
Yin-Cheng Lin, Hsin-Chu (TW);
De-Sheng Yang, Hsin-Chu (TW);
Ming-Tsung Weng, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 153 days.

This patent is subject to a terminal disclaimer.

(21) Appl. No.: 15/863,999

(22) Filed: Jan. 8, 2018

(65) Prior Publication Data
US 2018/0173087 A1    Jun. 21, 2018

Related U.S. Application Data

(63) Continuation-in-part of application No. 14/527,775, filed on Oct. 30, 2014, now Pat. No. 9,897,907.

(30) Foreign Application Priority Data

May 2, 2014   (TW) .............................. 103115820 A
Sep. 26, 2017 (CN) .......................... 2017 1 0879277

(51) Int. Cl.
*G03B 21/20* (2006.01)
*G03B 33/08* (2006.01)

(52) U.S. Cl.
CPC ....... *G03B 21/2013* (2013.01); *G03B 21/204* (2013.01); *G03B 21/2033* (2013.01); *G03B 33/08* (2013.01); *G03B 21/2066* (2013.01)

(58) Field of Classification Search
CPC ................ G03B 21/204; G02B 26/008; H04N 9/31–3197
See application file for complete search history.

(56) References Cited

U.S. PATENT DOCUMENTS 5,580,142 A   12/1996 Kurematsu et al.
8,469,520 B2   6/2013 Maeda
(Continued)

FOREIGN PATENT DOCUMENTS

CN   101937127   1/2011
CN   101937161   1/2011
(Continued)

*Primary Examiner* — Michelle M Iacoletti
*Assistant Examiner* — Christopher A Lamb, II
(74) *Attorney, Agent, or Firm* — JCIPRNET

(57) ABSTRACT

An illumination system includes a coherent light source, a first light-combining device, an optical wavelength conversion module, and a first auxiliary light source. The coherent light source emits a coherent light beam. The first light-combining device is disposed on a transmission path of the coherent light beam. The light wavelength conversion module is disposed on a transmission path of the coherent light beam transmitted from the first light-combining device and converts the coherent light beam into a first converted light beam, and reflects the first converted light beam back to the first light-combining device. The first auxiliary light source emits a first auxiliary light beam which is transmitted to the first light-combining device. The first light-combining device combines the first auxiliary light beam and the first (Continued)

converted light beam. A projection apparatus and a method for driving the illumination system are also provided.

23 Claims, 13 Drawing Sheets

(56) References Cited

U.S. PATENT DOCUMENTS

| | | |
|---|---|---|
| 8,911,092 B2 | 12/2014 | Fujita et al. |
| 9,151,471 B2 | 10/2015 | Ogura |
| 9,229,301 B2 | 1/2016 | Huang |
| 9,348,204 B2 | 5/2016 | Chiu et al. |
| 9,411,218 B2 | 8/2016 | Hsieh et al. |
| 9,645,480 B2 | 5/2017 | Liao et al. |
| 9,897,907 B2 | 2/2018 | Hsieh et al. |
| 2005/0057145 A1 | 3/2005 | Shieh et al. |
| 2010/0245776 A1 | 9/2010 | Yamamoto |
| 2010/0328554 A1 | 12/2010 | Shibasaki |
| 2010/0328626 A1 | 12/2010 | Miyazaki |
| 2010/0328632 A1 | 12/2010 | Kurosaki et al. |
| 2011/0043764 A1 | 2/2011 | Narikawa |
| 2011/0205502 A1 | 8/2011 | Kato et al. |
| 2011/0310353 A1 | 12/2011 | Maeda |
| 2012/0062857 A1 | 3/2012 | Saitou et al. |
| 2012/0075591 A1 | 3/2012 | Ogura et al. |
| 2012/0242912 A1 | 9/2012 | Kitano |
| 2013/0021582 A1 | 1/2013 | Fujita et al. |
| 2013/0083509 A1 | 4/2013 | Ko |
| 2013/0100417 A1 | 4/2013 | Yang et al. |
| 2013/0100420 A1 | 4/2013 | Ferri et al. |
| 2013/0250253 A1 | 9/2013 | Ogura |
| 2013/0314671 A1 | 11/2013 | Tseng |
| 2013/0322056 A1* | 12/2013 | Konuma .............. F21V 13/14 362/84 |
| 2014/0071407 A1 | 3/2014 | Takahashi et al. |
| 2014/0211169 A1 | 7/2014 | Kitano et al. |
| 2014/0254129 A1* | 9/2014 | Miyoshi ............. F21V 13/08 362/84 |
| 2014/0285774 A1 | 9/2014 | Tajiri |
| 2014/0340649 A1* | 11/2014 | Takahashi ........... G03B 21/204 353/31 |
| 2015/0016907 A1 | 1/2015 | Frick |
| 2015/0023012 A1 | 1/2015 | Yang et al. |
| 2015/0153636 A1 | 6/2015 | Hartwig |
| 2015/0167907 A1 | 6/2015 | Hoehmann |
| 2015/0177599 A1 | 6/2015 | Huang |
| 2015/0253653 A1 | 9/2015 | Fujita et al. |
| 2015/0316775 A1 | 11/2015 | Hsieh et al. |
| 2015/0362830 A1 | 12/2015 | Liao et al. |
| 2016/0223892 A1* | 8/2016 | Takahashi ............ H04N 9/3111 |
| 2017/0045810 A1* | 2/2017 | Huang ................. G03B 21/204 |
| 2017/0192347 A1 | 7/2017 | Huang et al. |

FOREIGN PATENT DOCUMENTS

| | | |
|---|---|---|
| CN | 101937165 | 1/2011 |
| CN | 101995750 | 3/2011 |
| CN | 102155639 | 8/2011 |
| CN | 102213383 | 10/2011 |
| CN | 102393598 | 3/2012 |
| CN | 102520569 | 6/2012 |
| CN | 102650809 | 8/2012 |
| CN | 102722073 | 10/2012 |
| CN | 102722075 | 10/2012 |
| CN | 102854729 | 1/2013 |
| CN | 102890398 | 1/2013 |
| CN | 103052841 | 4/2013 |
| CN | 103062672 | 4/2013 |
| CN | 103207507 | 7/2013 |
| CN | 103324015 | 9/2013 |
| CN | 203217230 | 9/2013 |
| CN | 103453448 | 12/2013 |
| CN | 103676428 | 3/2014 |
| CN | 204593250 | 8/2015 |
| CN | 105022214 | 11/2015 |
| CN | 105278226 | 1/2016 |
| CN | 104238248 | 7/2016 |
| EP | 2360523 | 8/2011 |
| JP | 2004341105 | 12/2004 |
| JP | 2011128521 | 6/2011 |
| JP | 2011209555 | 10/2011 |
| JP | 2014075221 | 4/2014 |
| KR | 20130024564 | 3/2013 |
| TW | 580545 | 3/2004 |
| TW | 200408784 | 6/2004 |
| TW | M423266 | 2/2012 |
| TW | M436167 | 8/2012 |
| TW | 201307756 | 2/2013 |
| TW | 201319718 | 5/2013 |
| TW | 201335691 | 9/2013 |
| TW | 201405048 | 2/2014 |
| TW | M482090 | 7/2014 |
| TW | 201512762 | 4/2015 |
| TW | 201546495 | 12/2015 |
| WO | 2013056594 | 4/2013 |
| WO | 2014006206 | 1/2014 |
| WO | 2014046219 | 3/2014 |

* cited by examiner

ILLUMINATION SYSTEM, PROJECTION APPARATUS AND METHOD FOR DRIVING ILLUMINATION SYSTEM

CROSS-REFERENCE TO RELATED APPLICATION

This application is a continuation-in-part application of and claims the priority benefit of a prior application Ser. No. 14/527,775, filed on Oct. 30, 2014, now allowed. The prior application Ser. No. 14/527,775 claims the priority benefit of Taiwan application serial no. 103115820, filed on May 2, 2014. This application also claims the priority benefit of China application serial no. 201710879277.X, filed on Sep. 26, 2017. The entirety of each of the above-mentioned patent applications is hereby incorporated by reference herein and made a part of this specification.

BACKGROUND OF THE INVENTION

Field of the Invention

The invention relates to an optical system and a display apparatus. More particularly, the invention relates to an illumination system and a projection apparatus.

Description of Related Art

With advances in display technology, there are a variety of display devices available for users to choose, such as liquid crystal displays, organic light-emitting diode (OLED) displays and projection devices. Since projection devices may produce larger images in smaller sizes, some applications thereof can not be replaced, such as presentations used for conference meeting, home theaters, classroom education or research, and so forth, in which people participate.

In recent years, projection devices equipped with light-emitting diodes (LEDs) or laser diodes as a solid-state light source gradually dominate the market, wherein the laser diodes gain much attention for its higher luminous efficiency. The projection devices equipped with laser diodes as a solid-state light source produce desired pure lights by exciting phosphors by the laser light emitted from a light source, and using a color wheel to achieve sequential displays and a purpose of enhancing purity of the desired color light.

Although laser diodes have higher luminous efficiency, such projection devices still face an issue of parts of color lights having insufficient brightness. In the prior art, brightness of color lights is enhanced primarily by adjusting compositions of phosphor materials; however, this method is not adapted for adjusting brightness of particular color lights. In addition, there are different methods for controlling light-emitting ratios of different color lights by adjusting areas of corresponding colors on the color wheel; however, this method may lead to other issues. Take red light as an example, red phosphor is rarely used as an excited material due to its poor reliability (low tolerance and poor conversion efficiency). Therefore, the red light is usually obtained by arranging phosphor capable of exciting yellow light in coordination with a red filtering sheet on the color wheel and allowing the excited yellow light to pass through the red filtering sheet. However, the red filtering sheet would filter out portions of the red light having wavelength with the yellow band. Consequently, such approach could not effectively enhance brightness of the red light. On another aspect, if an area of the red filtering sheet on the color wheel is adjusted for enhancing brightness of the red light, areas of other colored filtering sheets have to be inevitably adjusted. When the areas are not adjusted properly, the display devices may have issues of color shifts or insufficient brightness of parts of the color lights. Accordingly, how to effectively enhance brightness of different color lights and avoid color shifts have become one of urgent issues to be solved by researchers nowadays.

China Patent No. 103062672 discloses a projection apparatus provided with phosphors in different colors and color wheels to achieve full color. U.S. Pat. No. 8,469,520 discloses a projection apparatus for enhancing color rendering property by arranging reference light sources in different colors. U.S. Patent Publication No. 20130083509 discloses a projection apparatus for enhancing brightness of each color light by arranging reference light sources with different colors.

SUMMARY OF THE INVENTION

The invention provides an illumination system having a superior brightness.

The invention further provides a projection apparatus employing the illumination system and is capable of enhancing brightness of color lights.

Other objects and advantages of the invention may be further understood by the technical features disclosed in the invention. In order to achieve one or a portion of or all of the objects or other objects, an embodiment of the invention provides an illumination system including a coherent light source, a first light-combining device, an optical wavelength conversion module, a first auxiliary light source and a filtering module. The coherent light source is adapted to emit a coherent light beam. The first light-combining device is disposed on a transmission path of the coherent light beam. The optical wavelength conversion module comprises a first wavelength conversion area, the optical wavelength conversion module is disposed on the transmission path of the coherent light beam transmitted from the first light-combining device, the first light-combining device is located between the coherent light source and the optical wavelength conversion module, wherein when the coherent light beam irradiates the optical wavelength conversion module, the optical wavelength conversion module converts the coherent light beam into a first converted light beam and reflects the first converted light beam back to the first light-combining device. A wavelength of the first converted light beam is different from a wavelength of the coherent light beam. The first auxiliary light source is adapted to emit a first auxiliary light beam. A wavelength of the first auxiliary light beam is different from the wavelength of the coherent light beam, wherein the first auxiliary light beam is transmitted to the first light-combining device, and a transmitting direction of the first auxiliary light beam is different from a transmitting direction of the first converted light beam before the first auxiliary light beam and the first converted light beam are being combined. The filtering module is adapted to filter the first converted light beam and the first auxiliary light beam to generate a first light beam. A light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining device without being transmitted to the optical wavelength conversion module.

Other objects and advantages of the invention may be further understood by the technical features disclosed in the invention. In order to achieve one or a portion of or all of the objects or other objects, an embodiment of the invention provides that a projection apparatus comprises an illumination system, a light valve and a projection lens. An embodiment of the invention provides an illumination system including a coherent light source, a first light-combining device, an optical wavelength conversion module, a first auxiliary light source and a filtering module. The coherent light source is adapted to emit a coherent light beam. The first light-combining device is disposed on a transmission path of the coherent light beam. The optical wavelength conversion module comprises a first wavelength conversion area, the optical wavelength conversion module is disposed on the transmission path of the coherent light beam transmitted from the first light-combining device, the first light-combining device is located between the coherent light source and the optical wavelength conversion module, wherein when the coherent light beam irradiates the optical wavelength conversion module, the optical wavelength conversion module converts the coherent light beam into a first converted light beam and reflects the first converted light beam back to the first light-combining device. A wavelength of the first converted light beam is different from a wavelength of the coherent light beam. The first auxiliary light source is adapted to emit a first auxiliary light beam. A wavelength of the first auxiliary light beam is different from the wavelength of the coherent light beam, wherein the first auxiliary light beam is transmitted to the first light-combining device, and a transmitting direction of the first auxiliary light beam is different from a transmitting direction of the first converted light beam before the first auxiliary light beam and the first converted light beam are being combined. The filtering module is adapted to filter the first converted light beam and the first auxiliary light beam to generate a first light beam. A light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining device without being transmitted to the optical wavelength conversion module. The light valve is disposed on a transmission path of an illumination beam from the illumination system to convert the illumination beam into an image light beam, wherein the illumination beam is formed from the first converted light beam and the first auxiliary light beam. The projection lens is disposed on a transmission path of the image light beam.

Other objects and advantages of the invention may be further understood by the technical features disclosed in the invention. In order to achieve one or a portion of or all of the objects or other objects, a method of the invention provides that a method for driving an illumination system. The illumination system comprises a coherent light source adapted to emit a coherent light beam, a first light-combining device is disposed on a transmission path of the coherent light beam, an optical wavelength conversion module comprises a first wavelength conversion area and a reflection area, the optical wavelength conversion module is disposed on the transmission path of the coherent light beam transmitted from the first light-combining device, a first auxiliary light source is adapted to emit a first auxiliary light beam, and a filtering module. The method comprises: turning on the coherent light source, turning on the first auxiliary light source during a period when the first wavelength conversion area cuts into the transmission path of the coherent light beam, wherein the first auxiliary light beam is transmitted to the filtering module through the first light-combining device without being transmitted to the optical wavelength conversion module, and turning off the first auxiliary light source during a period when the light reflection area cuts into the transmission path of the coherent light beam.

A light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam. The first auxiliary light beam is transmitted to the filtering module through the first light-combining device without being transmitted to the optical wavelength conversion module. In an embodiment of the invention, the optical wavelength conversion module includes a reflection area and a first wavelength conversion area. The coherent light beam irradiates the reflection area. The coherent light beam reflects by the reflection area. The illumination system further includes a light transmission module disposed on the transmission path of the coherent light beam passing through the optical wavelength conversion module to transmit the coherent light beam from the light passing-through area back to the first light-combining device. In view of the above, the illumination system of the embodiment of the invention enhances purity and brightness of color lights by arranging the first auxiliary light source. Accordingly, the illumination system of the embodiment and the projection apparatus employing the illumination system of the invention has superior brightness. In addition, since the above embodiments of the invention enhance brightness of specific colors without adjusting an area ratio of each color in the optical wavelength conversion module, color shifts or insufficient brightness of partial colors may be avoided. In order to make the aforementioned and other features and advantages of the invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that both the foregoing and other detailed descriptions, features, and advantages are intended to be described more comprehensively by providing embodiments accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the invention.

Figure 1:
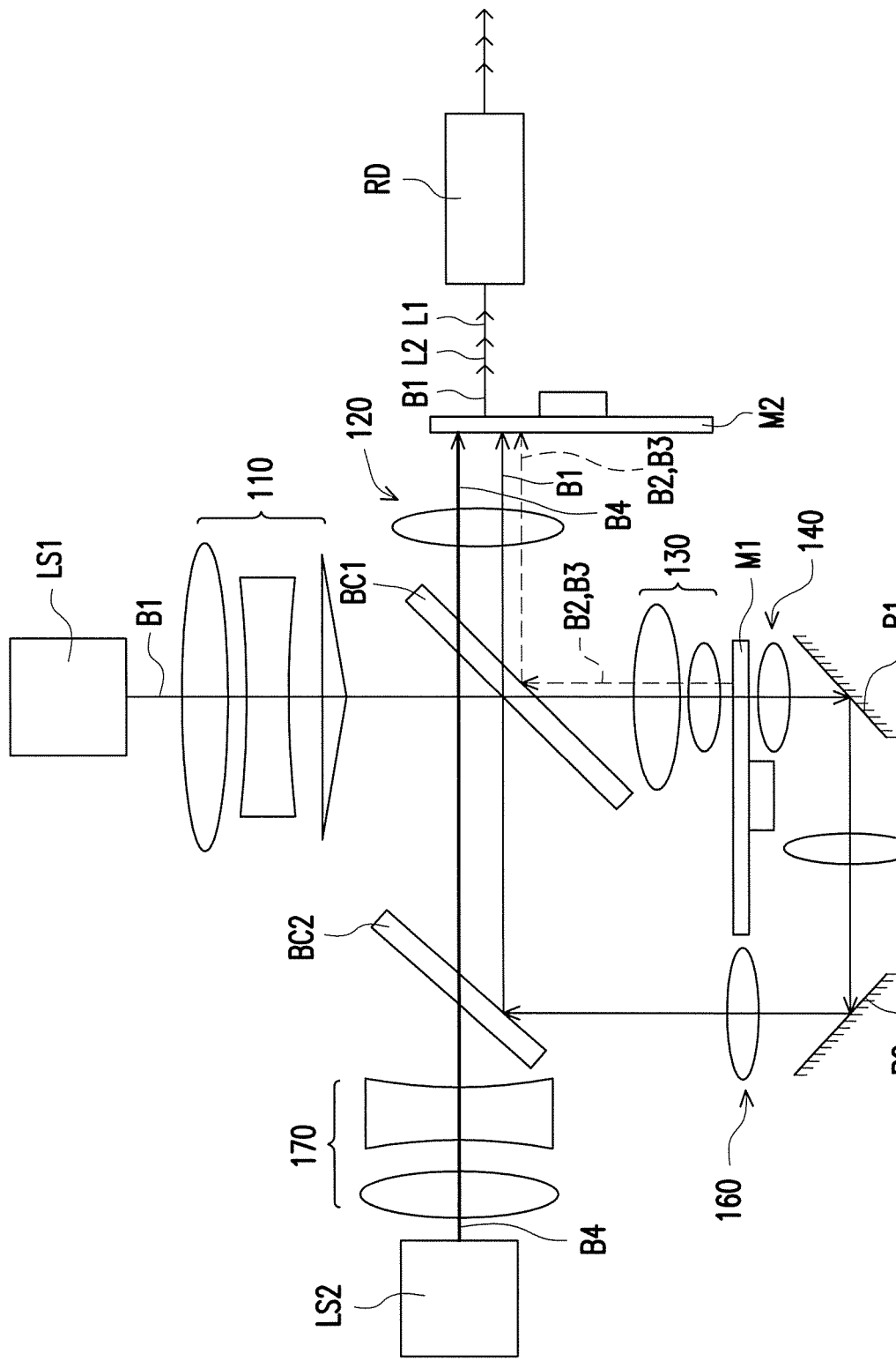
FIG. 1 is a schematic view illustrating an illumination system according to a first embodiment of the invention.
Figure 2:
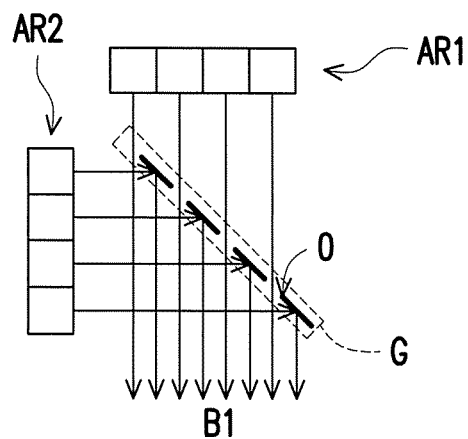
FIG. 2 is another type implementing a coherent light source depicted in FIG. 1.
Figure 3:
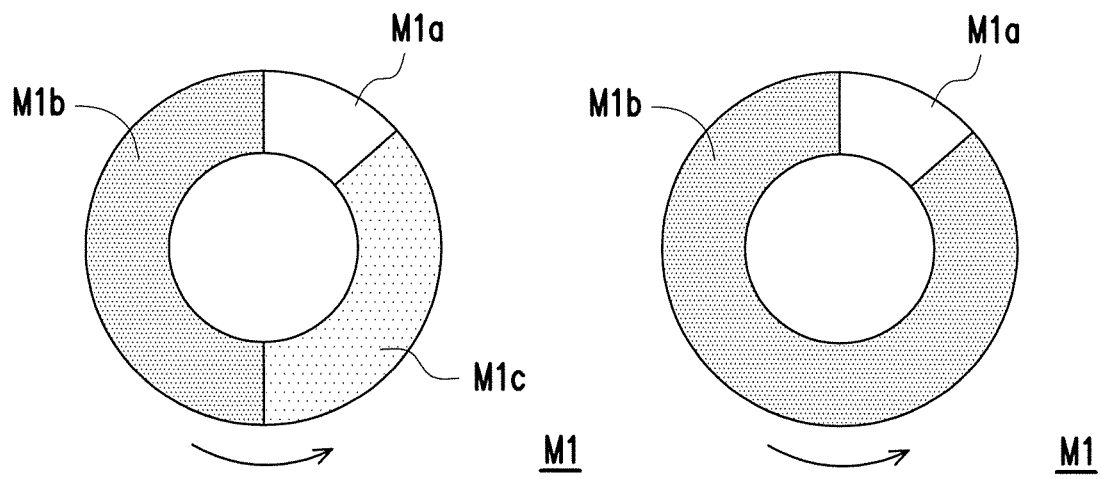
FIG. 3 is a top view illustrating a light wavelength conversion module depicted in FIG. 1.
Figure 4:
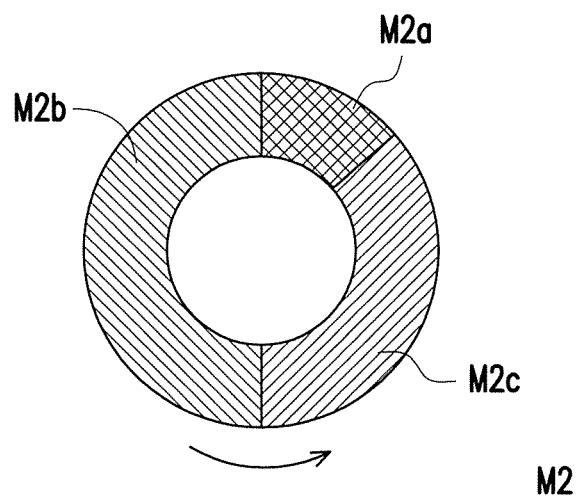
FIG. 4 is a top view illustrating a filtering module depicted in FIG. 1.

FIG. 1 is a schematic view illustrating an illumination system according to a first embodiment of the invention. FIG. 2 is another type implementing a coherent light source depicted in FIG. 1. FIG. 3 is a top view illustrating a light wavelength conversion module depicted in FIG. 1. FIG. 4 is a top view illustrating a light wavelength conversion module depicted in FIG. 1. With reference to FIG. 1 to FIG. 4, an illumination system 100 includes a coherent light source LS1, a first light-combining device BC1, an optical wavelength conversion module M1, and a first auxiliary light source LS2.

The coherent light source LS1 is adapted to emit a coherent light beam B1. The coherent light source LS1 of the embodiment, for example, is a laser light source, the coherent light beam B1, for example, is a laser light beam, and a color of the laser light beam, for example, is blue; however, the invention is not limited thereto. In addition, the coherent light source LS1 may be an array arranged by a plurality of laser diodes, which is sufficient enough to generate a high light output power and has an advantage of capable of dynamically adjusting numbers of light sources (numbers of the laser diodes) to be adapted to be applied to various projection apparatuses with different brightness requirements.

In another embodiment, as shown in FIG. 2, the coherent light source LS1 may also include a first array AR1, a second array AR2, and an optical grating G, wherein the optical grating G includes a plurality of openings O which are arranged at spaced interval. The first array AR1 and the second array AR2, for example, are arranged by the plurality of laser diodes, wherein the laser diodes of the first array AR1 are disposed at one side of the optical grating G, and are adapted to emit the coherent light beams B1 toward openings O of the optical grating G, such that the coherent light beams B1 emitted from the first array AR1 correspondingly pass through the openings O. On another aspect, the laser diodes of the second array AR2 are disposed at another side of the optical grating G, and are adapted to emit the coherent light beams B1 toward an area other than the openings O of the optical grating G. The coherent light beams B1 emitted from the second array AR2 are reflected by the optical grating G and then transmitted along a transmitting direction of the coherent light beams B1 passing through the openings O. Consequently, density of the coherent light beams B1 transmitted to the first light-combining device BC1 (shown in FIG. 1) is effectively increased.

Next, with reference to FIG. 1 to FIG. 4, the first light-combining device BC1 is disposed on the transmission path of the coherent light beams B1 and located between the coherent light source LS1 and the optical wavelength conversion module M1. The first light-combining device BC1 allows a light beam with a specific light wavelength to pass through and reflects a light beam with the other specific wavelength (details are further illustrated later), and the first light-combining device BC1 of the embodiment allows the coherent light beam B1 emitted from the coherent light source LS1 to pass through. For example, the first light-combining device BC1 may be a dichroic mirror, a dichroic filter, or an X-cube prism.

The optical wavelength conversion module M1 is disposed on the transmission path of the coherent light beam B1 transmitted from the first light-combining device BC1, and the optical wavelength conversion module M1 has a rotating shaft (not marked) and is rotated around a central axis of the rotating shaft. The central axis of the rotating shaft of the optical wavelength conversion module M1 is parallel to the transmitting direction of the coherent light beam B1. The optical wavelength conversion module M1, for example, includes a light passing-through area M1a and a first wavelength conversion area M1b. In practical applications, the optical wavelength conversion module M1 may further include a second wavelength conversion area M1c to provide more color, wherein the light passing-through area M1a, the first wavelength conversion area M1b and the second wavelength conversion area M1c, for example, are arranged along a circular path rotating around the central axis of the rotating shaft of the optical wavelength conversion module M1, such that when the optical wavelength conversion module M1 rotates, the light passing-through area M1a, the first wavelength conversion area M1b, and the second wavelength conversion area M1c cut into the transmission path of the coherent light beam B1 in turn.

When the coherent light beam B1 passing through the first light-combining device BC1 irradiates the light passing-through area M1a of the optical wavelength conversion module M1, the coherent light beam B1 passes through the light passing-through area M1a. When the coherent light beam B1 passing through the first light-combining device BC1 irradiates the first wavelength conversion area M1b, the first wavelength conversion area M1b converts the coherent light beam B1 into a first converted light beam B2. In addition, when the coherent light beam B1 passing through the first light-combining device BC1 irradiates the second wavelength conversion area M1c, the second wavelength conversion area M1c converts the coherent light beam B1 into a second converted light beam B3, wherein the first converted light beam B2 and the second converted light beam B3, for example, are reflected back to the first light-combining device BC1 along the same path. However, the invention is not limited thereto. Furthermore, a wavelength of the first converted light beam B2 is different from a wavelength of the second converted light beam B3, and the wavelengths of the first converted light beam B2 and the second converted light beam B3 are different from a wavelength of the coherent light beam B1. For example, colors of the first converted light beam B2 and the second converted light beam B3 are yellow and green, respectively, but the invention is not limited thereto.

The first wavelength conversion area M1b and the second wavelength conversion area M1c may be provided with a phosphor layer or a quantum dot layer, respectively, to correspondingly convert the coherent light beam B1 into the first converted light beam B2 and the second converted light beam B3. For example, in the embodiment, the first wavelength conversion area M1b is provided with a yellow phosphor layer to convert the blue coherent light beam B1 into the yellow first converted light beam B2, while the second wavelength conversion area M1c is provided with a green phosphor layer to convert the blue coherent light beam B1 into the green second converted light beam B3; however, the invention is not limited thereto. Moreover, the optical wavelength conversion module M1 may further include a carrier plate (not shown) to carry the phosphor layers or the quantum dot layers. The carrier plate may be a light reflection carrier plate or a transparent carrier plate. When the optical wavelength conversion module M1 uses the light reflection carrier plate, the light reflection carrier plate may be made of metals, alloys or a combination thereof, and may form the light passing-through area M1a in a way of hollowing the light reflection carrier plate for allowing the coherent light beam B1 to passing through the light passing-through area M1a, and the light reflection carrier plate reflects the first converted light beam B2 and the second converted light beam B3 back to the first light-combining device BC1. Additionally, a hollowed light passing-through area M1a may be provided with transparent diffusion sheet, filled with the transparent materials having a surface having diffusion structure or filled with the transparent materials containing scattering particles for producing effects of diffusing the coherent light beam B1 passing through the light passing-through area M1a, thereby reducing speckle degrees of the coherent light beam B1, and thereby minimizing speckle noises of the illumination system 100. On another aspect, when the optical wavelength conversion module M1 uses a transmissive carrier plate, the optical wavelength conversion module M1 may further arrange a light reflection element on the first wavelength conversion area M1b and the second wavelength conversion area M1c and arrange the light reflection element between the phosphor layers (or the quantum dot layers) and the carrier plate to reflect the first converted light beam B2 and the second converted light beam B3 back to the first light-combining device BC1, and may produce effects of diffusing the coherent light beam B1 passing through the light passing-through area M1a by arranging the scattering structure on a surface of the carrier or arranging the scattering particles within the carrier. Therefore, the speckle degrees of the coherent light beam B1 is reduced, and the speckle noises of the illumination system 100 is minimized. It should be noted that an arrangement or a design parameter such as an area ratio of the light passing-through area M1a, the first wavelength conversion area M1b, and the second wavelength conversion area M1c may be determined based on requirements of actual designs. The optical wavelength conversion module M1 of the invention is not limited to the type as shown in FIG. 3. In the other embodiment of the invention, the right side of FIG. 3 describes that the light passing-through area M1a and the first wavelength conversion area M1b. The first wavelength conversion area M1b may be provided with a phosphor layer or a quantum dot layer, respectively, to correspondingly convert the coherent light beam B1 into the first converted light beam B2. For example, in the embodiment, the first wavelength conversion area M1b is provided with a yellow phosphor layer to convert the blue coherent light beam B1 into the yellow first converted light beam B2; however, the invention is not limited thereto. Moreover, the optical wavelength conversion module M1 may further include a carrier plate (not shown) to carry the phosphor layers or the quantum dot layers. The carrier plate may be a light reflection carrier plate or a transparent carrier plate.

The illumination system 100 may further includes a light transmission module disposed on the transmission path of the coherent light beam B1 transmitted from the optical wavelength conversion module M1 to transmit the coherent light beam B1 passing through the light passing-through area M1a back to the first light-combining device BC1. The optical transmission module of the embodiment includes two reflecting mirrors R1 and R2 configured for changing the transmitting direction of the coherent light beam B1, wherein the reflecting mirror R1 is disposed between the optical wavelength conversion module M1 and the reflecting mirror R2, but numbers of elements, varieties and arrangements of the optical wavelength conversion module are not limited in the invention.

The first auxiliary light source LS2 is adapted to emit a first auxiliary light beam B4, wherein a wavelength of the first auxiliary light beam B4 is different from the wavelength of the coherent light beam B1 to enhance purity and brightness of specific color lights other than the color of the coherent light beam B1 of the illumination system 100. For example, the first auxiliary light source LS2 may be set to be turned on during at least a period when the first wavelength conversion area M1b cuts into the transmission path of the coherent light beam B1, such that the first auxiliary light beam B4 and the first converted light beam B2 transmitted to the first light-combining device BC1 are mixed, and thereby enhancing purity, brightness and a color rendering property of specific light colors. In the embodiment, the first auxiliary light source LS2, for example, is a red light source, and the first auxiliary light source LS2 is set to be turn on during a period when the first wavelength conversion area M1b cuts into the transmission path of the coherent light beam B1 so as to enhance purity and brightness of a red light of the illumination system 100, but the invention is not limited thereto. The color of the first auxiliary light beam B4 (or a light wavelength spectrum range thereof) and a turn-on time for the first auxiliary light source LS2 may be determined based on requirements.

In addition, the first auxiliary light source LS2 may include at least one light emitting diode (LED) or at least one laser diode, and numbers of the light emitting diode (LED) or the laser diode may be one or more. When the first auxiliary light source LS2 is the light emitting diode (LED), the first auxiliary light beam B4 is a visible light beam; and when the first auxiliary light source LS2 is the laser diode, the first auxiliary light beam B4 is a laser light beam.

The first auxiliary light beam B4 of the embodiment, for example, is transmitted to the first light-combining device BC1 along the transmission path of the coherent light beam B1 from the light passing-through area M1a. More specifically, the illumination system 100 further includes a second light-combining device BC2. The second light-combining device BC2 may be a dichroic mirror, a dichroic filter, or an X-cube prism. The second light-combining device BC2 is disposed on a transmission path of the first auxiliary light beam B4 and the transmission path of the coherent light beam B1 transmitted from the optical wavelength conversion module M1, and disposed between the first auxiliary light source LS2 and the first light-combining device BC1, such that the coherent light beam B1 from the light passing-through area M1a is transmitted to the first light-combining device BC1 sequentially through the light transmission module (including the reflecting mirrors R1 and R2) and the second light-combining device BC2, and the first auxiliary light beam B4 is transmitted to the first light-combining device BC1 through the second light-combining device BC2. The first light-combining device BC1 then combines the first auxiliary light beam B4 and the first converted light beam B2 reflected from the optical wavelength conversion module M1. In other words, the first converted light beam B2 reflected back to the first light-combining device BC1 by the optical wavelength conversion module M1 is reflected by the first light-combining device BC1, and thereby is transmitted along the transmission path of the first auxiliary light beam B4 passing through the first light-combining device BC1.

As shown in FIG. 1, the first light-combining device BC1 is adapted to reflect the first converted light beam B2 and the second converted light beam B3 from the optical wavelength conversion module M1, and allows the first auxiliary light beam B4 and the coherent light beam B1 to pass through. On another aspect, the second light-combining device BC2 is adapted to reflect the coherent light beam B1 transmitted from the optical wavelength conversion module M1 and allows the first auxiliary light beam B4 to pass through. In the embodiment, the coherent light source LS1 is a blue light source, the first auxiliary light source LS2 is a red light source, and colors of the first converted light beam B2 and the second converted light beam B3 are yellow and green, respectively. Therefore, the first light-combining device BC1 may be designed to be adapted to reflect a light beam having a wavelength ranging from 460 nm to 630 nm, and allow a light beam having a wavelength less than 460 nm or more than 630 nm to pass through. On another aspect, the second light-combining device BC2 may be designed to be adapted to reflect a light beam having a wavelength less than or equal to 460 nm, and allow a light beam having a wavelength more than 460 nm to pass through. Furthermore, a light wavelength spectrum range of the coherent light beam B1 is at least partially less than or equal to 460 nm, and preferably less than 460 nm, to increase a ratio of the coherent light beam B1 passing through the first light-combining device BC1 and a ratio of the coherent light beam B1 reflected by the second light-combining device BC2. Moreover, a light wavelength spectrum range of the first auxiliary light beam B4 is at least partially more than 630 nm, and preferably more than 630 nm, to increase ratios of the first auxiliary light beam B4 passing through the first light-combining device BC1 and the second light-combining device BC2.

The reflecting mirror R2 in FIG. 1 is disposed between the second light-combining device BC2 and the reflecting mirror R1, but the invention is not limited thereto. In another embodiment, the second light-combining device BC2 may also be disposed between the reflecting mirror R1 and the reflecting mirror R2, and located between the first auxiliary light source LS2 and the reflecting mirror R1.

In order to provide a light beam having better color purity, the illumination system 100 may further include a filtering module M2 disposed on the transmission paths of the first converted light beam B2, the second converted light beam B3, the first auxiliary light beam B4, and the coherent light beam B1 from the first light-combining device BC1. The filtering module M2, for example, is divided into areas in correspondence with the optical wavelength conversion module M1. As shown in FIG. 4, the filtering module M2, for example, includes a light pervious area M2a, a first filtering area M2b, and a second filtering area M2c.

The light pervious area M2a of the filtering module M2 cuts into the transmission path of the coherent light beam B1 passing through the light passing-through area M1a corresponding to the light passing-through area M1a of the optical wavelength conversion module M1, and the coherent light beam B1 passes through the light pervious area M2a. The first filtering area M2b of the filtering module M2 cuts into the transmission paths of the first converted light beam B2 and the first auxiliary light beam B4 corresponding to the first wavelength conversion area M1b of the optical wavelength conversion module M1, and the first filtering area M2b filters the first converted light beam B2 and the first auxiliary light beam B4 to generate a first light beam L1. The second filtering area M2c of the filtering module M2 cuts into the transmission path of the second converted light beam B3 corresponding to the second wavelength conversion area M1c of the optical wavelength conversion module M1, and the second filtering area M2c filters the second converted light beam B3 to generate a second light beam L2, wherein a light wavelength spectrum range of the second light beam L2 is narrower than a light wavelength spectrum range of the second converted light beam B3, and a light wavelength spectrum range of the first light beam L1 is narrower than a light wavelength spectrum range of the first converted light beam B2, so as to enhance purity of colors.

In the embodiment, the filtering module M2, for example, is a color wheel having a rotating shaft (not numbered) and rotating around a central axis of the rotating shaft, such that the light pervious area M2a, the first filtering area M2b, and the second filtering area M2c of the filtering module M2 sequentially cut into a transmission path of a corresponding light beam corresponding to the light passing-through area M1a, the first wavelength conversion area M1ba, and the second wavelength conversion area M1c of the optical wavelength conversion module M1 respectively, wherein the light pervious area M2a is provided with a diffusion sheet to minimize the speckle noises of the illumination system 100. Besides, the first filtering area M2b and the second filtering area M2c are respectively provided with the filtering sheets to filter a partial spectrum of the corresponding converted light beams, such that purity of each pure color light emitted from the illumination system 100 may be effectively enhanced. For example, the first filtering area M2b provided with a red filtering sheet allows the first converted light beam B2 and the first auxiliary light beam B4 to pass through, and filters the first converted light beam B2 and the first auxiliary light beam B4 to generate the red first light beam L1 with high color purity; and the second filtering area M2c provided with a green filtering sheet allows the second converted light beam B3 to pass through, and filters the second converted light beam B3 to generate the green second light beam L2 with high color purity.

Since intensity of the first light beam L1 is directly proportional to a ratio of the first converted light beam B2 and the first auxiliary light beam B4 passing through the first filtering area M2b, the light wavelength spectrum range of the first converted light beam B2 is at least partially overlapped with the light wavelength spectrum range of the first light beam L1, and the light wavelength spectrum range of the first auxiliary light beam B4 is at least partially overlapped with the light wavelength spectrum range of the first light beam L1, so as to reduce a ratio of the first converted light beam B2 and the first auxiliary light beam B4 being filtered by the first filtering area M2b of the filtering module M2. The light wavelength spectrum range of the first auxiliary light beam B4 may be at least partially overlapped with the light wavelength spectrum range of the first converted light beam B2, or the light wavelength spectrum range of the first auxiliary light beam B4 may be proximate to but not overlapped with the light wavelength spectrum range of the first converted light beam B2.

In the embodiment, the light pervious area M2a is not provided with a filtering sheet. Accordingly, in order to prevent blue color shift caused by the first auxiliary light beam B4 passing through the light pervious area M2a due to the first auxiliary light source LS2 being turned on continuously from occurring, the first auxiliary light source LS2 is set to be turned on during a period when the first wavelength conversion area M1b cuts into the transmission path of the coherent light beam B1, and to be turned off during periods when the light passing-through area M1a and the second wavelength conversion area M1c cut into the transmission path of the coherent light beam B1, such that the first auxiliary light beam B4 combines with the first converted light beam B2 at the first light-combining device BC1 prior to mixture. Further, color purity, brightness and a color rendering property and so forth of the first light beam L1 generated from the first auxiliary light beam B4 and the first converted light beam B2 are effectively enhanced. Nevertheless, the invention is not limited thereto. In another embodiment, the light pervious area M2a may be provided with a blue filtering sheet. Accordingly, even if the first auxiliary light source LS2 is continuously turned on during the periods when the light passing-through area M1a and the second wavelength conversion area M1c cut into the transmission path of the coherent light beam B1, the filtering sheets located on the light pervious area M2a and the second filtering area M2c may filter the first auxiliary light beam B4, such that color shift may be prevented. Namely, under a structure of providing a filtering sheet on the light pervious area M2a, the first auxiliary light source LS2 may be turned on continuously.

In addition, the illumination system 100 of the embodiment may further include a light uniform device RD disposed on the transmission paths of the coherent light beam B1, the first light beam L1 and the second light beam L2 from the filtering module M2. The light uniform device RD, for example, is an optical integration rod or a lens array (not shown). The optical integration rod may a hollow integration rod which is consisted of a plurality of reflecting mirrors or a solid integration rod for improving uniformity of laser by using multiple reflections. Furthermore, the illumination system 100 of the embodiment may also be provided with lens sets 110, 120, 130, 140, 150, 160, and 170 on the transmission paths of the coherent light beam B1 and the first auxiliary light beam B4, wherein each of the lens sets 110, 120, 130, 140, 150, 160, and 170 may include at least one lens for converging lights, but the invention is not limited thereto.

In the embodiment, the first auxiliary light beam B4 and the first converted light beam B2 are mixed before being transmitted to the filtering module M2, so that a related arrangement of the first light-combining device BC1, the filtering module M2, and a device located after a light path of the filtering module M2 (such as the light uniform device RD, for example, integrated rod) of the embodiment does not need to be changed. In other words, in the embodiment, purity and brightness of a color light beam in the illumination system 400 are enhanced with an arrangement of the first auxiliary light source LS2 without drastically changing a structure of an illumination system. Moreover, since brightness of specific colors is enhanced without adjusting the area ratio of the light passing-through area M1a, the first wavelength conversion area M1b, and the second wavelength conversion area M1c on the optical wavelength conversion module M1 in the embodiment, color shifts or insufficient brightness of partial colors may be avoided.

Although the above embodiment is provided with the first auxiliary light source LS2 as a red light source, but the invention is not limited thereto. In another embodiment, the first auxiliary light source LS2 may also be a green light source. Accordingly, positions of the phosphor layers or the quantum dot layers on the first wavelength conversion area M1b and the second wavelength conversion area M1c need to be interchanged, such that colors of the first converted light beam B2 and the second converted light beam B3 are green and yellow, respectively. In addition, positions of the filtering sheets of the first filtering area M2b and the second filtering area M2c also need to be interchanged, such that a color of the first light beam L1 is green, and a color of the second light beam L2 is red. Furthermore, the first light-combining device BC1, for example, may be designed to be adapted to reflect a light beam having a wavelength ranging from 460 nm to 545 nm or a light beam having a wavelength larger than 555 nm, and to allow a light beam having a wavelength ranging from 545 nm to 555 nm or a light beam having a wavelength less than 460 nm to pass through. On another aspect, the second light-combining device BC2 may be designed to be adapted to reflect a light beam having a wavelength less than or equal to 460 nm, and to allow a light beam having a wavelength more than 460 nm to pass through.

Figure 5:
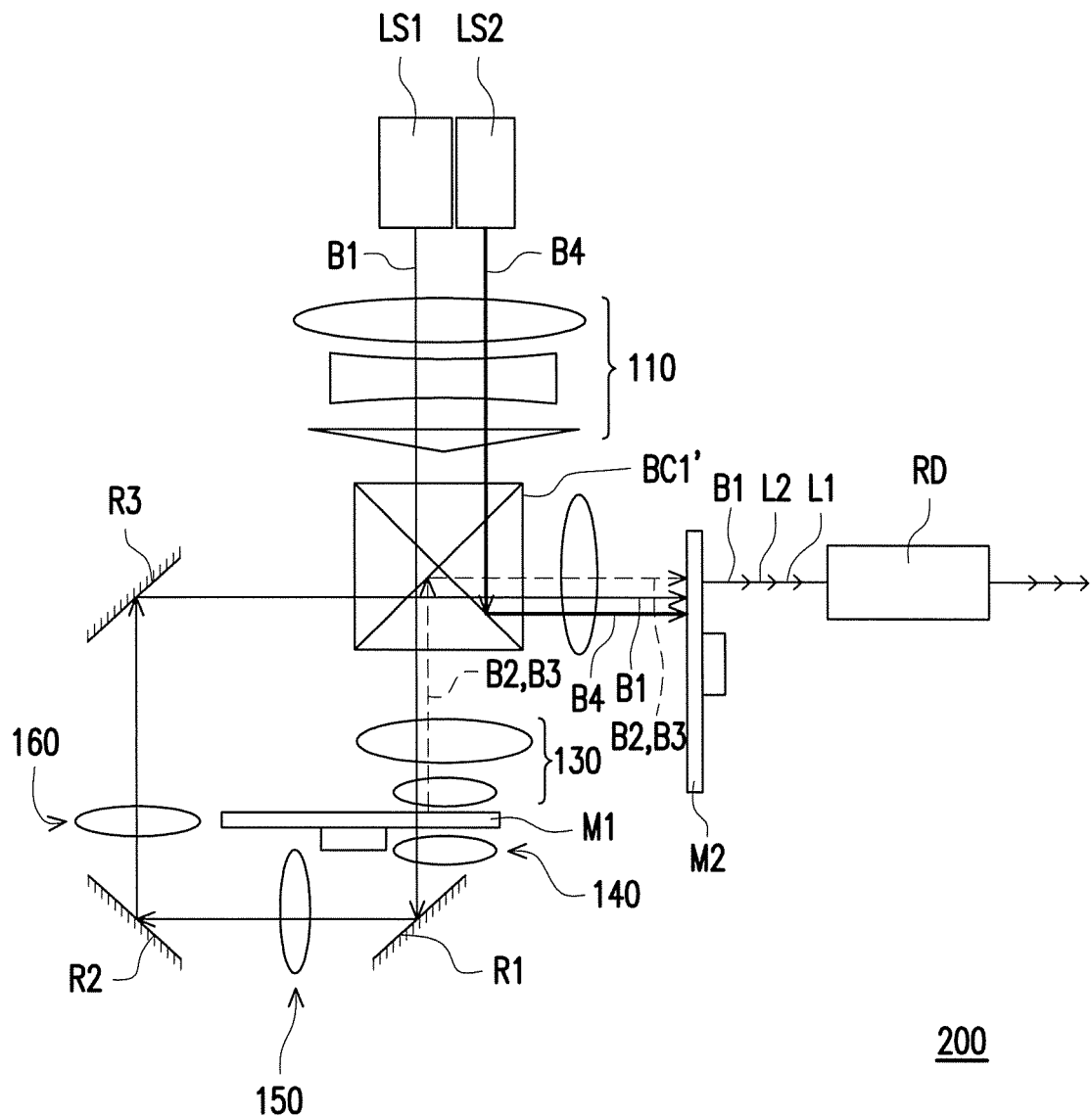
FIG. 5 is a schematic view illustrating an illumination system according to a second embodiment of the invention.

FIG. 5 is a schematic view illustrating an illumination system according to a second embodiment of the invention. With reference to FIG. 5, an illumination system 200 of the embodiment is substantially the same as the illumination system 100 of FIG. 1, and the same components are represented by the same reference numbers, which are not reiterated hereinafter. The primary difference between two illumination systems lies in that the first auxiliary light beam B4 emitted from the first auxiliary light source LS2 of the embodiment is transmitted to a first light-combining device BC1' along the transmission path of the coherent light beam B1 emitted from the coherent light source LS1.

More specifically, the coherent light source LS1 and the first auxiliary light source LS2 of the embodiment are located at the same side of the first light-combining device BC1', and the coherent light beam B1 from the coherent light source LS1 and the first auxiliary light beam B4 from the first auxiliary light source LS2 are incident to the same surface of the first light-combining device BC1'. In addition, the first light-combining device BC1', for example, is a prism having a light splitting and a light combining functions to transmit the first auxiliary light beam B4 toward the filtering module M2, and allow the coherent light beam B1 to pass through. Furthermore, since the first auxiliary light beam B4 is directly incident into the first light-combining device BC1' and mixed with the first converted light beam B2, the arrangement of the second light-combining device BC2 in FIG. 1 may be omitted in the embodiment, and the light transmission module may further include a reflecting mirror R3 disposed at the position of the second light-combining device BC2 in FIG. 1 to transmit the coherent light beam B1 passing through the optical wavelength conversion module M1 back to the first light-combining device BC1'.

Figure 6:
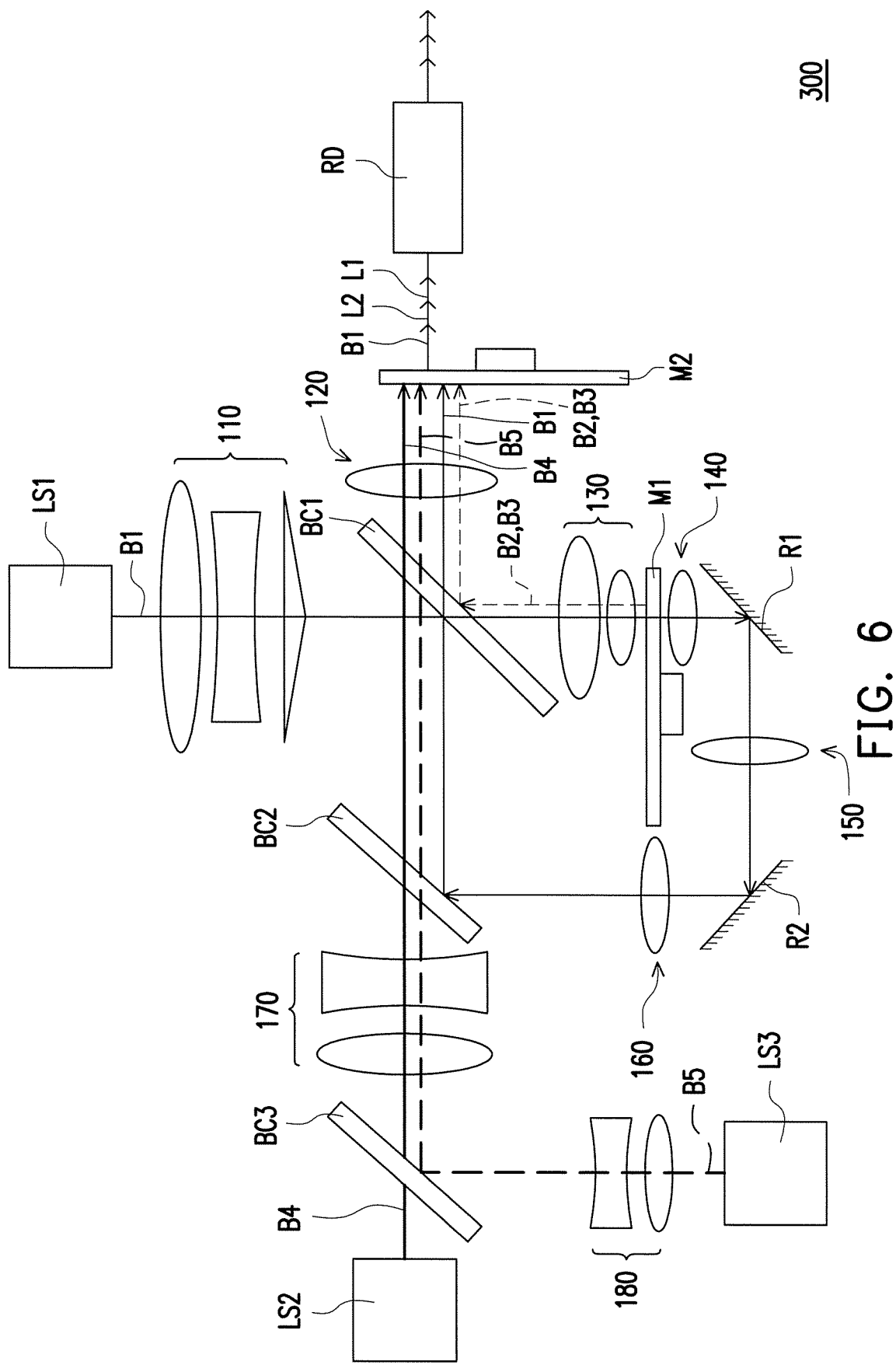
FIG. 6 is a schematic view illustrating an illumination system according to a third embodiment of the invention.

FIG. 6 is a schematic view illustrating an illumination system according to a third embodiment of the invention. With reference to FIG. 6, an illumination system 300 of the embodiment is substantially the same as the illumination system 100 of FIG. 1, and the same components are represented by the same reference numbers, which are not reiterated hereinafter. The primary difference between two illumination systems lies in that the illumination system 300 of the embodiment further includes a second auxiliary light source LS3 and a third light-combining device BC3. The second auxiliary light source LS3 is adapted to emit a second auxiliary light beam B5, wherein a wavelength of the second auxiliary light beam B5 is different from the wavelengths of the coherent light beam B1 and the first auxiliary light beam B4. In the embodiment, the second auxiliary light source LS3, for example, is configured for enhancing color purity, brightness and a color rendering property of the second light beam L2 emitted from the second filtering area M2c (with reference to FIG. 4). For example, the second auxiliary light source LS3 is a green light source, and the second auxiliary light source LS3 may include at least one light emitting diode (LED) or at least one laser diode, and numbers of the light emitting diode (LED) or the laser diode may be one or more.

The third light-combining device BC3 is disposed on the transmission path of the first auxiliary light beam B4 and a transmission path of the second auxiliary light beam B5, and the third light-combining device BC3 is disposed between the second auxiliary light source LS3 and the second light-combining device BC2, wherein the first auxiliary light beam B4 from the first auxiliary light source LS2 and the second auxiliary light beam B5 from the second auxiliary light source LS3 are respectively transmitted to the first light-combining device BC1 through the third light-combining device BC3 and the second light-combining device BC2 in sequence, and the first auxiliary light beam B4 and the second auxiliary light beam B5 are transmitted to the first light-combining device BC1 along the transmission path of the coherent light beam B1 from the light passing-through area M1a (with reference to FIG. 3). In addition, the first light-combining device BC1 combines the first auxiliary light beam B4 and the first converted light beam B2 reflected from the optical wavelength conversion module M1, and combines the second auxiliary light beam B5 and the second converted light beam B3 reflected from the optical wavelength conversion module M1.

When the first filtering area M2b cuts into the transmission paths of the first converted light beam B2 and the first auxiliary light beam B4 corresponding to the first wavelength conversion area M1b of the optical wavelength conversion module M1, the first filtering area M2b filters the first converted light beam B2 and the first auxiliary light beam B4 to generate the first light beam L1, wherein the light wavelength spectrum range of the first light beam L1 is narrower than the light wavelength spectrum range of the first converted light beam B2. On another aspect, when the second filtering area M2b cuts into the transmission paths of the second converted light beam B3 and the second auxiliary light beam B5 corresponding to the second wavelength conversion area M1c of the optical wavelength conversion module M1, the second filtering area M2c filters the second converted light beam B3 and the second auxiliary light beam B5 to generate the second light beam L2, wherein the light wavelength spectrum range of the second light beam L2 is narrower than the light wavelength spectrum range of the second converted light beam B3. Whether the first auxiliary light source LS2 and the second auxiliary light source LS3 are continuously turned on or are turned on when the corresponding filtering area moves to the transmission path of the corresponding light beam depends on whether the light pervious area M2a of the filtering module M2 is provided with a filtering sheet. This part of the content may be referred to the above description and is not reiterated hereinafter.

As shown in FIG. 6, the third light-combining device BC3 is adapted to reflect the second auxiliary light beam B5 from the second auxiliary light source LS3, and allow the first auxiliary light beam B4 to pass through. The second light-combining device BC2 is adapted to reflect the coherent light beam B1 passing through the optical wavelength conversion module M1, and allow the first auxiliary light beam B4 and the second auxiliary light beam B5 to pass through. The first light-combining device BC1 is adapted to reflect the first converted light beam B2 and the second converted light beam B3 reflected from the optical wavelength conversion module M1, and allow the first auxiliary light beam B4, the second auxiliary light beam B5, and the coherent light beam B1 to pass through. Therefore, the first light-combining device BC1 may be designed to be adapted to reflect a light beam having a wavelength ranging from 460 nm to 545 nm and a light beam having a wavelength ranging from 555 nm to 630 nm, and allow light beams having a wavelength less than 460 nm, ranging from 545 nm to 555 nm, or more than 630 nm to pass through. On another aspect, the second light-combining device BC2 may be designed to be adapted to reflect a light beam having a wavelength less than or equal to 460 nm, and allow a light beam having a wavelength more than 460 nm to pass through; and the third light-combining device BC3 may be designed to be adapted to reflect a light beam having a wavelength less than 630 nm, and allow a light beam having a wavelength more than or equal to 630 nm to pass through.

Furthermore, the illumination system 300 of the embodiment may also be provided with a lens set 180 disposed on the transmission path of the second auxiliary light beam B5, and located between the second auxiliary light source LS3 and the third light-combining device BC3, wherein the lens set 180 may include at least one lens for converging lights, but the invention is not limited thereto.

Figure 7:
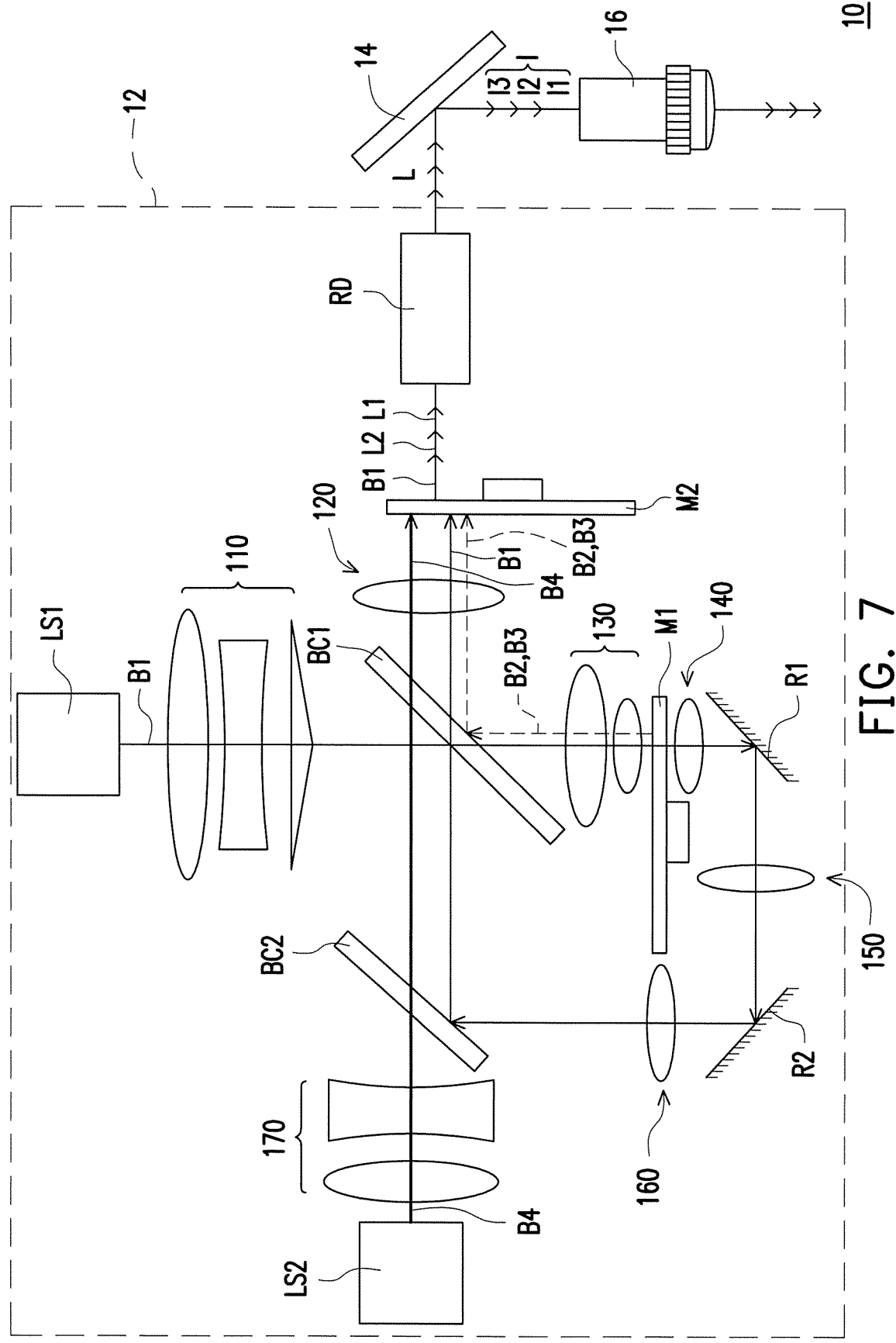
FIG. 7 is a schematic view illustrating a projection apparatus according to a first embodiment of the invention.

FIG. 7 is a schematic view illustrating a projection apparatus according to a first embodiment of the invention. With reference to FIG. 7, a projection apparatus 10 includes an illumination system 12, a light valve 14, and a projection lens 16. The illumination system 12 may be one of the illumination systems 100, 200, and 300 of FIG. 1, FIG. 5 and FIG. 6 illustrated in the embodiments. The optical arrangement of the illumination system 100 is taken as an example to illustrate the illumination system 12 of the embodiment, but the invention is not limited thereto. The light valve 14 is disposed on a transmission path of an illumination beam L from the illumination system 12 (i.e., the illumination system 100 of FIG. 1) to convert the illumination beam L into an image light beam I, wherein the illumination beam L is formed from the first converted light beam B2 and the first auxiliary light beam B4. More particularly, the illumination beam L is formed from the coherent light beam B1, the first converted light beam B2, the second converted light beam B3 and the first auxiliary light beam B4. Accordingly the illumination beam L of the embodiment includes the first light beam L1, the second light beam L2, and the coherent light beam B1.

The light valve 14, for example, is a digital micro-mirror device (DMD), a liquid-crystal-on-silicon panel, a transmission liquid crystal panel, or other appropriate spatial light modulators (SLMs), and is adapted to convert the first light beam L1, the second light beam L2, and the coherent light beam B1 of the illumination beam L into a first image light beam I1, a second image light beam I2, and a third image light beam I3, wherein a transmission path of the first image light beam I1, a transmission path of the second image light beam I2, and a transmission path of the third image light beam I3 are substantially coincided. The projection lens 16 is disposed on the transmission path of the image light beam I, and configured to project the first image light beam I1, the second image light beam I2, and the third image light beam I3 to a screen or other objects configured for forming images. In the embodiment, the light valve 14 is illustrated by taking a digital micro-mirror device (DMD) as an example. The first image light beam I1, the second image light beam I2, and the third image light beam I3, for example, are respectively a red image light beam, a green image light beam, and a blue image light beam. When these image light beams are projected in high frequency to a screen in turn, users may see color images on the screen by a vision persistence theory. If the light valve 14 are three transmission liquid crystal panels, then the images light beams are projected to the screen in another manner (not reiterated herein) for users to view color images.

Figure 8A:
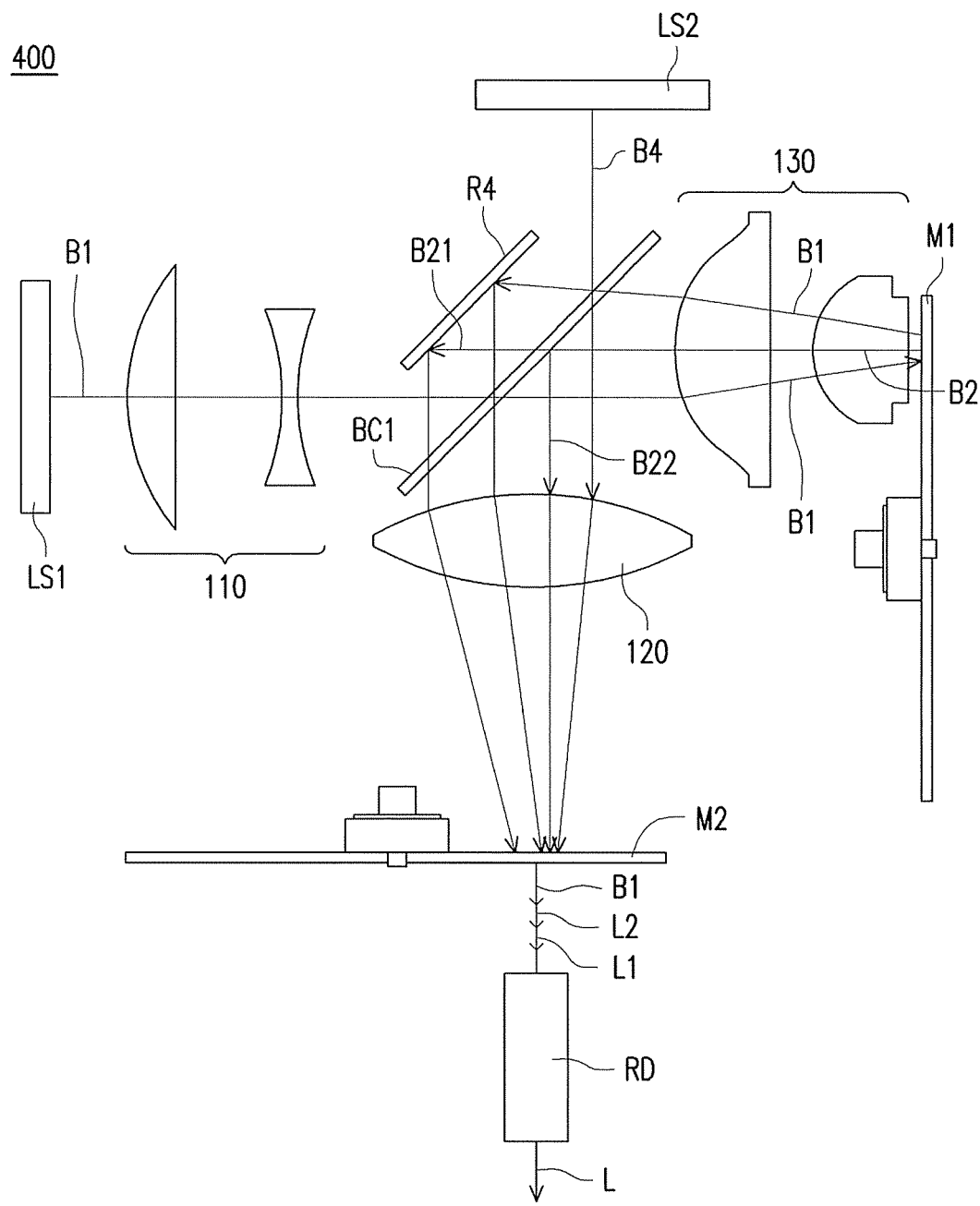
FIG. 8A is a schematic view illustrating an illumination system according to a fourth embodiment of the invention.

FIG. 8A is a schematic view illustrating an illumination system according to a fourth embodiment of the invention. Referring to FIG. 8A, the illumination system 400 of the embodiment is similar to the illumination system 100 depicted in FIG. 1, and the main difference therebetween, for example, lies in that the coherent light beam B1 of the embodiment is reflected by the optical wavelength conversion module M1 after passing the first light-combining device BC1.

Specifically, the first light-combining device BC1 of the embodiment allows the coherent light beam B1 emitted from the coherent light source LS1 to pass through. In the FIG. 3, the optical wavelength conversion module M1, for example, includes a reflection area to reflect the coherent light beam B1 to the reflecting mirror R4 through the first light-combining device BC1. In the embodiment, the light passing-through area M1a depicted in FIG. 3 may be designed as the reflection area to form the optical wavelength conversion module M1 of the embodiment. In other words, the coherent light beam B1 reflected by the reflection area M1a of the optical wavelength conversion module M1 transmits to the reflecting mirror R4 through the first light-combining device BC1. Besides, the reflecting mirror R4 and the first light-combining device BC1 are separated by a gap, for example, as an air gap. The reflecting mirror R4 does not dispose on the transmission path of the auxiliary light beam LS2. Next, the reflecting mirror R4 reflects the coherent light beam B1 to the filtering module M2. The filtering module M2 is adapted to filter the first converted light beam and the first auxiliary light beam to generate a first light beam L1. Specifically, the filtering module M2 filters the useless wavelength of light and passing the desired wavelength of light such that purity of each pure color light emitted from the illumination system 400 may be effectively enhanced. In the embodiment, the transmitting direction of the first auxiliary light beam B4 is different from a transmitting direction of the first converted light beam B2 before the first auxiliary light beam B4 and the first converted light beam B2 are being combined. In the embodiment, the transmitting direction of the first auxiliary light beam B4 is perpendicular to the transmitting direction of the first converted light beam B2 before the first auxiliary light beam B4 and the first converted light beam B2 are combined. Besides, in the embodiment, the transmitting direction of the first auxiliary light beam B4 is perpendicular to the transmitting direction of the coherent light beam B1 before the first auxiliary light beam B4 and the coherent light beam B1 are combined.

In the embodiment, the first auxiliary light source LS2 and the reflecting mirror R4 are disposed on the same side of the first light-combining device BC1. The first auxiliary light source LS2 is adapted to emit the first auxiliary light beam B4. For example, the first auxiliary light beam B4 may be a red light beam, and the invention is not limited thereto. The first auxiliary light beam B4 passes the first light-combining device BC1 and transmits to the lens set 120. The invention is not limited number of the lens set. The first light-combining device BC1 allows the coherent light beam B1 and the first auxiliary light beam B4 to pass through and the first converted light beam B2 to be reflected.

In an embodiment, the first converted light beam B2 has a first light wavelength spectrum range (the red light beam B21) and a second light wavelength spectrum range (the yellow or green light beam B22). The first light wavelength spectrum range is at least partially overlapped with the light wavelength spectrum range of the first auxiliary light beam B4. The first light-combining device BC1 reflects the yellow or green light beam B22 and allows the red light beam B21 and the first auxiliary light beam B4 to pass through. The reflecting mirror R4 reflects the red light beam B21 back to the first light-combining device BC1, such that the red light beam B21 passes the first light-combining device BC1 and transmits to the lens set 120.

In the embodiment, the coherent light beam B1, the first converted light beam B2 and the first auxiliary light beam B4 form the illumination beam L. The first auxiliary light source LS2 emits the first auxiliary light beam B4. The wavelength of the first auxiliary light beam B4 is different from the wavelength of the coherent light beam B1 to enhance purity and brightness of specific color lights other than the color of the coherent light beam B1 of the illumination system 400.

Figure 8B:
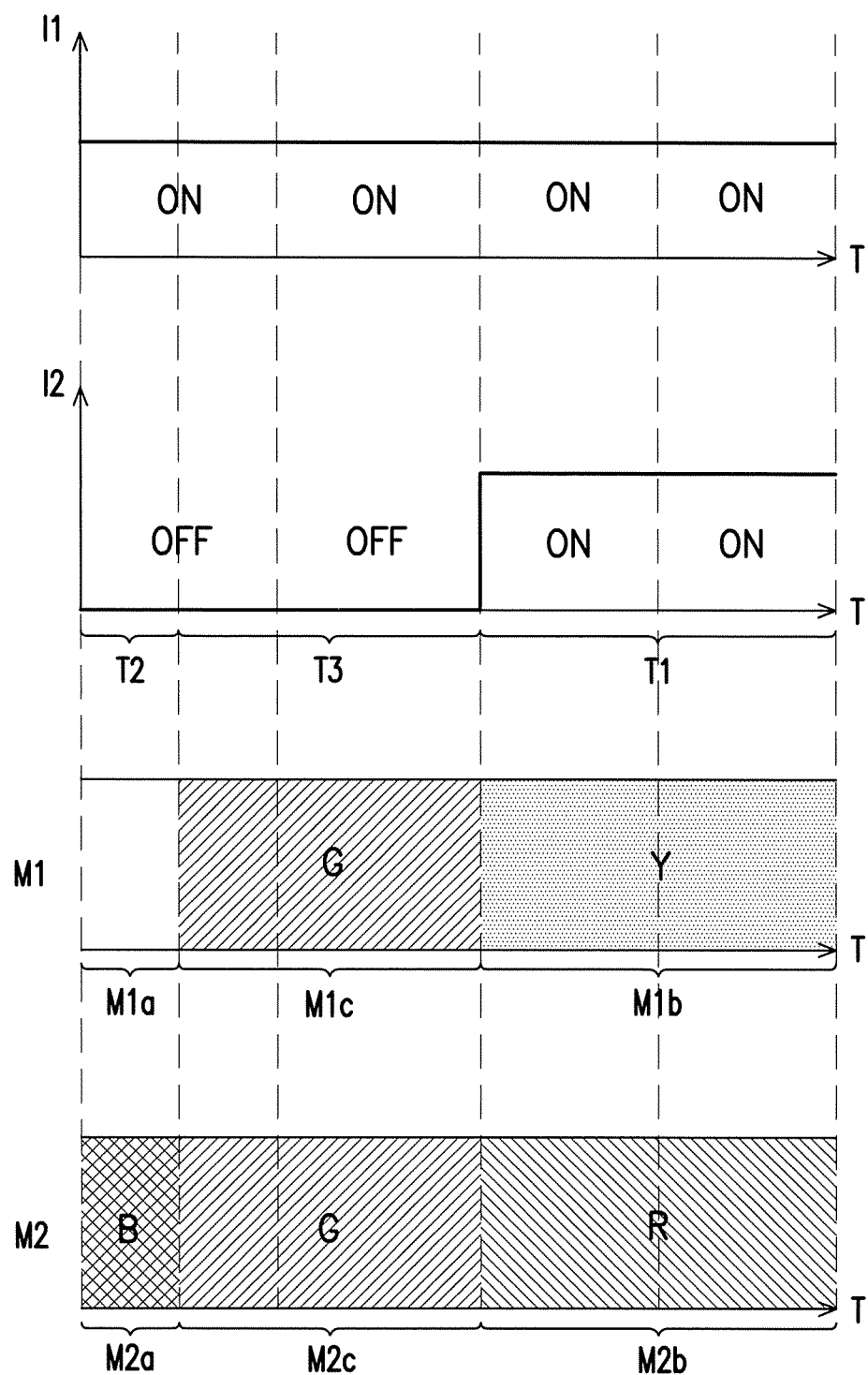
FIG. 8B illustrates timing diagrams of currents for driving the coherent light source and the first auxiliary light source and timing diagrams of the optical wavelength conversion module and the filtering module depicted in FIG. 8A.

FIG. 8B illustrates timing diagrams of currents for driving the coherent light source LS1 and the first auxiliary light source LS2 and timing diagrams of the optical wavelength conversion module M1 and the filtering module M2 depicted in FIG. 8A.

Referring to FIG. 8A, FIG. 8B and left side of FIG. 3, the current I1 is configured to drive the coherent light source LS1 to output the coherent light beam B1. The high level of the current I1 turns on the coherent light source LS1 to output the coherent light beam B1. The current I2 is configured to drive the first auxiliary light source LS2. The high level of the current I2 turns on the first auxiliary light source LS2 to output the first auxiliary light beam B4. The low level of the current I2 turns off the first auxiliary light source LS2, such that the first auxiliary light source LS2 does not output the first auxiliary light beam B4. The invention does not limit methods of driving the light sources. Using Pulse Width Modulation (PWM) or Voltage may be available.

In the embodiment, the coherent light source LS1 is set to be turned on during the period T1 and the first auxiliary light source LS2 is set to be turned on during the period T1 when the coherent light beam B1 irradiates the first wavelength conversion area M1b of the optical wavelength conversion module M1 so that the first auxiliary light beam B4 is combined with the first converted light beam B2.

The first auxiliary light source LS2 is set to be turned off during period T2 when the reflection area M1a cuts into the transmission path of the coherent light beam B1. In other embodiment of the invention, the first auxiliary light source LS2 is set to be turned off during periods T2 and T3 when the reflection area M1a and the second wavelength conversion area M1c cut into the transmission path of the coherent light beam B1.

Figure 8C:
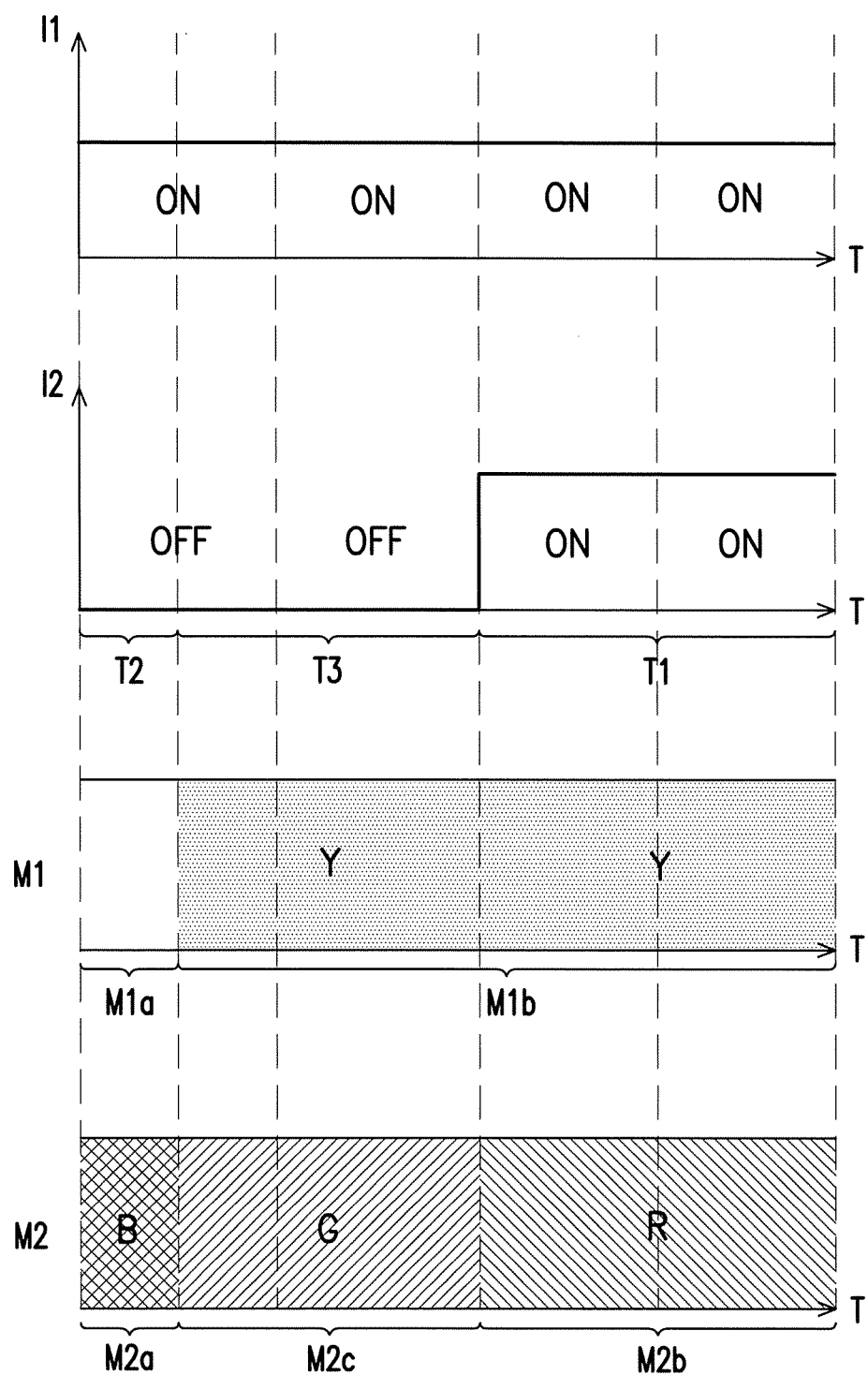
FIG. 8C illustrates timing diagrams of currents for driving the coherent light source and the first auxiliary light source and timing diagrams of another optical wavelength conversion module and the filtering module depicted in FIG. 8A.

In the other embodiment of the invention, FIG. 8C illustrates timing diagrams of currents for driving the coherent light source LS1 and the first auxiliary light source LS2 and timing diagrams of the optical wavelength conversion module M1 and the filtering module M2 depicted in FIG. 8A. Referring to FIG. 8A, FIG. 8C and right side of FIG. 3, the current I1 is configured to drive the coherent light source LS1 to output the coherent light beam B1. The high level of the current I1 turns on the coherent light source LS1 to output the coherent light beam B1. The current I2 is configured to drive the first auxiliary light source LS2. The high level of the current I2 turns on the first auxiliary light source LS2 to output the first auxiliary light beam B4. The low level of the current I2 turns off the first auxiliary light source LS2, such that the first auxiliary light source LS2 does not output the first auxiliary light beam B4. The invention does not limit methods of driving the light sources. Using Pulse Width Modulation (PWM) or Voltage may be available.

In the embodiment, the coherent light source LS1 is set to be turned on during the period T1 and the first auxiliary light source LS2 is set to be turned on during the period T1 when the coherent light beam B1 irradiates the first wavelength conversion area M1b of the optical wavelength conversion module M1 so that the first auxiliary light beam B4 is combined with the first converted light beam B2.

The first auxiliary light source LS2 is set to be turned off during periods T2 when the reflection area M1a cuts into the transmission path of the coherent light beam B1. In other embodiment of the invention, the first auxiliary light source LS2 is set to be turned off during periods T2 and T3 when the reflection area M1a and part of the first wavelength conversion area M1b cut into the transmission path of the coherent light beam B1.

Figure 8D:
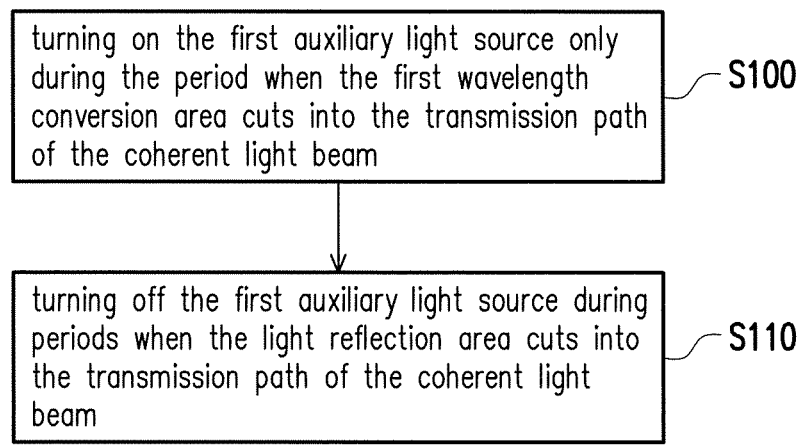
FIG. 8D is a flowchart illustrating steps in a method for driving an illumination system according to an embodiment of the invention.

FIG. 8D is a flowchart illustrating steps in a method for driving an illumination system according to an embodiment of the invention. Referring to FIG. 8A to FIG. 8D, the method of the embodiment is at least adapted to the illumination system 400 of FIG. 8A, but the invention is not limited thereto. Taking the illumination system 400 of FIG. 8A for example, in step S100, turning on the coherent light source LS1 and turning on the first auxiliary light source LS2 during the period T1 when the first wavelength conversion area M1b cuts into the transmission path of the coherent light beam B1. In step S110, turning off the first auxiliary light source LS2 during period T2 when the reflection area M1a cuts into the transmission path of the coherent light beam B1. In addition, sufficient teaching, suggestion, and implementation illustration regarding the method for driving the illumination system of the embodiment may be obtained from the foregoing embodiments of FIG. 8A, FIG. 8B and FIG. 8C, and thus related description thereof is not repeated hereinafter.

Figure 9:
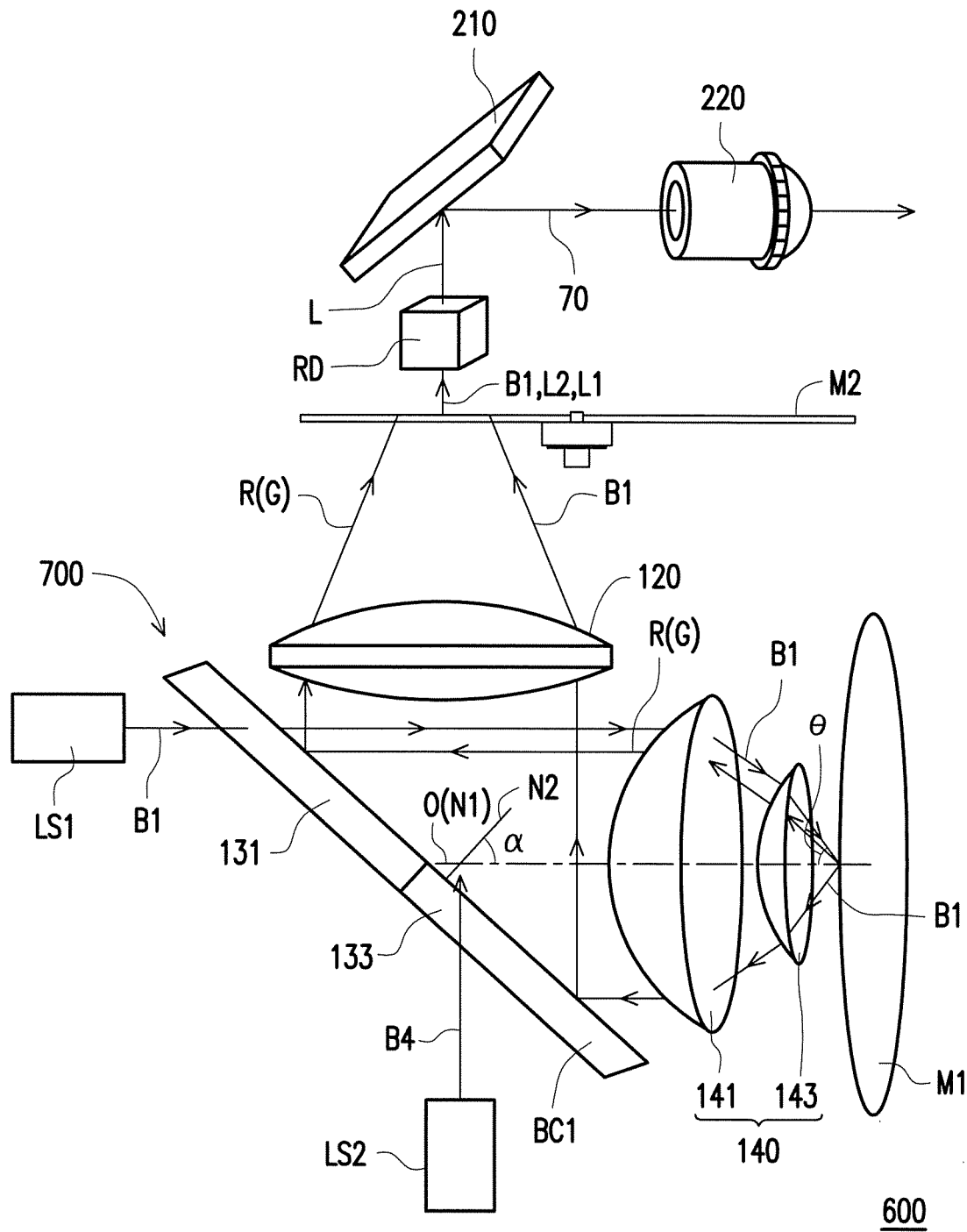
FIG. 9 is a schematic view illustrating a projection apparatus according to an embodiment of the invention.

FIG. 9 is a schematic view illustrating a projection apparatus according to an embodiment of the invention.

Referring to FIG. 9, the projection apparatus 600 of the embodiment includes an illumination system 700, a light valve 210 and a projection lens 220. In detail, in the embodiment, the illumination system 700 is configured to provide an illumination beam L. The light valve 210 is disposed on a transmission path of the illumination beam L, and is configured to convert the illumination beam L into an image beam 70. In the embodiment, the light valve 210 is, for example, a digital micro-mirror device (DMD) or a liquid-crystal-on-silicon panel (LCOS panel). However, in other embodiment, the light valve 210 can also be a transmissive liquid crystal panel or other spatial light modulator. The projection lens 220 is disposed on a transmission path of the image beam 70, and is configured to project the image beam 70 onto a screen (not shown) to form an image frame.

Further, in the embodiment, the illumination system 700 includes a coherent light source LS1, a first auxiliary light source LS2, an optical wavelength conversion module M1, a first light-combining device BC1, a filtering module M2 and a light uniform device RD. The coherent light source LS1 is configured to provide a coherent light beam B1. In the embodiment, the coherent light source LS1 is a laser exciting light source, and the coherent light beam B1 is an exciting beam. For example, the coherent light source LS1 is a blue-ray laser diode or blue-ray laser diode array, the coherent light beam B1 is a blue-ray laser beam, and the optical wavelength conversion module M1 is, for example, a wavelength conversion wheel or a fluorescent powder wheel, though the invention is not limited thereto. In other embodiment, the coherent light source LS1 is, for example, a blue-ray diode, the coherent light beam B1 is a blue-ray beam. The filtering module M2 is a filter or a color wheel for filtering the useless wavelength of light and passing the desired wavelength of light.

In the embodiment, the first auxiliary light source LS2 is adapted to emit the first auxiliary light beam B4. For example, the first auxiliary light beam B4 is a red beam, and the invention is not limited thereto. The first light-combining device BC1 allows the first auxiliary light beam B4 to pass through. The wavelength of the first auxiliary light beam B4 is different from the wavelength of the coherent light beam B1 to enhance purity and brightness of specific color lights other than the color of the coherent light beam B1 of the illumination system 700. The projection apparatus 600 may project the image frame with colorfulness and purity.

In the embodiment, the transmitting direction of the first auxiliary light beam B4 is different from the transmitting direction of the coherent light beam B1 before the first auxiliary light beam B4 and the coherent light beam B1 are combined. In the embodiment, the transmitting direction of the first auxiliary light beam B4 is perpendicular to the transmitting direction of the coherent light beam B1 before the first auxiliary light beam B4 and the coherent light beam B1 are combined.

Figure 10A:
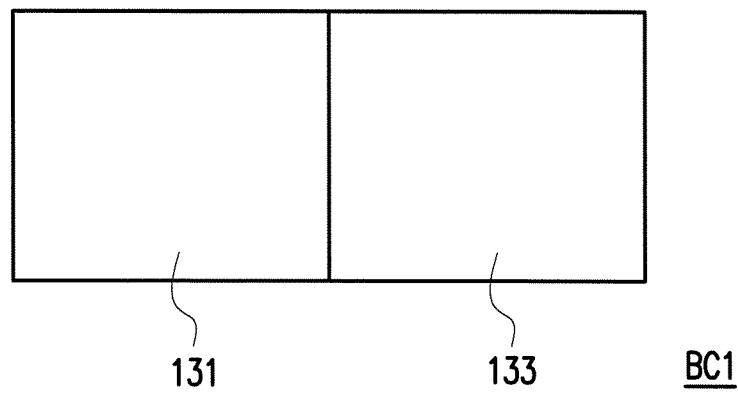
FIG. 10A is a front view of the first light-combining device of FIG. 9.

FIG. 10A is a front view of the first light-combining device of FIG. 9. In the embodiment, the first light-combining device BC1 is disposed on the transmission path of the coherent light beam B1, and is located between the coherent light source LS1 and the optical wavelength conversion module M1. In detail, the first light-combining device BC1 is a dichroic coating layer, a dichroic mirror, coating multiple layers or a dichroic mirror set, which has a plurality of different effective regions for providing different optical effects to the beams of different wavelengths, correspondingly. For example, as shown in FIG. 9 and FIG. 10A, the first light-combining device BC1 includes a wavelength reflecting portion 131 and a splitting portion 133, where the wavelength reflecting portion 131 is, for example, pervious to the blue-ray beam, and reflects beams with other wavelengths (for example, a red beam, a green beam, a yellow beam, etc.), and the splitting portion 133 reflects the blue-ray beam, and is pervious to the beams with other wavelengths (for example, the red beam, the green beam, the yellow beam, etc.). The first auxiliary light beam B4 passes the splitting portion 133 of the first light-combining device BC1 and transmits to the lens 120.

Next, the wavelength reflecting portion 131 of the first light-combining device BC1 is pervious to the coherent light beam B1. In this way, as shown in FIG. 9, the coherent light beam B1 passes through the first light-combining device BC1 and is incident to the optical wavelength conversion module M1. On the other hand, as shown in FIG. 9, in the embodiment, the illumination system 700 further includes a lens set 140, where the coherent light beam B1 is incident to the optical wavelength conversion module M1 through the lens set 140. In detail, in the embodiment, the lens set 140 may include a plurality of lenses 141 and 143, where concave surfaces of the concave-convex lenses 141 and 143 face the optical wavelength conversion module M1, and convex surfaces thereof face the first light-combining device BC1. For example, in the embodiment, a radius of curvature of the concave surface of the concave-convex lens 141 is 60 mm, a radius of curvature of the convex surface thereof is 10 mm; a radius of curvature of the concave surface of the concave-convex lens 143 is 40 mm, and a radius of curvature of the convex surface thereof is 7 mm. In this way, by using the concave-convex lenses 141 and 143 with suitable dioptres, the coherent light beam B1 can be incident to the optical wavelength conversion module M1 through the lens set 140 by an angle θ, where the angle θ ranges from 0 degree to 55 degree, and the angle θ is defined as an included angle between a normal direction N1 of the optical wavelength conversion module M1 and the coherent light beam B1. It should be noticed that the aforementioned value range is only used as an example, and the invention is not limited thereto.

Figure 10B:
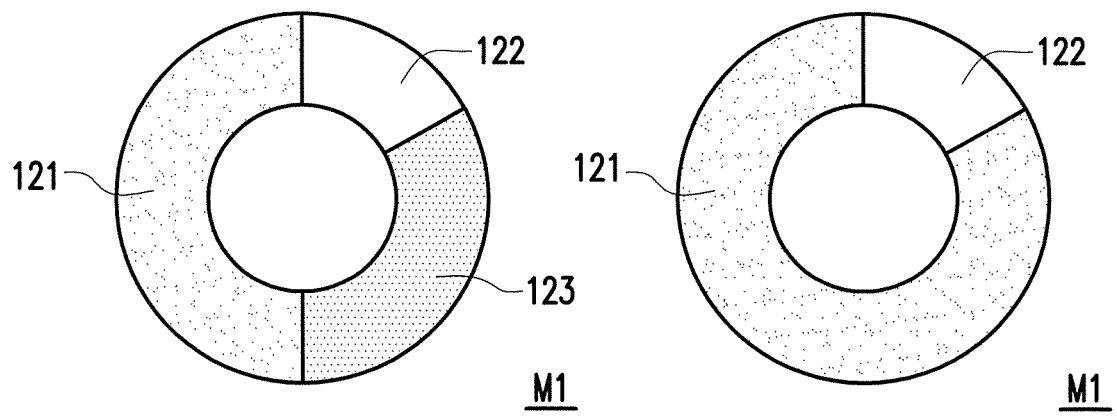
FIG. 10B is a front view of a wavelength conversion module of FIG. 9.
Figure 10C:
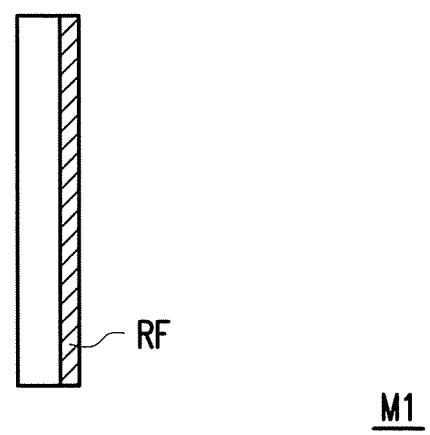
FIG. 10C is a side view of the wavelength conversion module of FIG. 10B.

FIG. 10B is a front view of a wavelength conversion module of FIG. 9, and FIG. 10C is a side view of the wavelength conversion module of FIG. 10B. Referring to left side of FIG. 10B and FIG. 10C, in the embodiment, the optical wavelength conversion module M1 includes a reflecting area 122 and at least one wavelength conversion area. In the embodiment, referring to left side of FIG. 10B, the wavelength conversion area includes a first wavelength conversion area 121 and a second wavelength conversion area 123 configured to convert different wavelengths, where the first wavelength conversion area 121 and the second wavelength conversion area 123 are respectively configured to convert a part of the coherent light beam B1 into wavelength conversion beams R and G, and the reflecting area 122 reflects a part of the coherent light beam B1. For example, the first and second wavelength conversion areas 121 and 123 respectively include a fluorescent powder layer, where colors of the fluorescent powder layers included in the first and second wavelength conversion areas 121 and 123 are respectively red color and green color. In this way, when the first and second wavelength conversion areas 121 and 123 are sequentially cut into the transmission path of the coherent light beam B1, the coherent light beam B1 is sequentially converted into the red and green wavelength conversion beams R and G. On the other hand, in the embodiment, the optical wavelength conversion module M1 has a reflective film RF on a surface facing back to the lens set 140, and when the coherent light beam B1 is incident to the reflecting area 122, the light coherent light beam B1 is reflected by the reflecting area 122. Moreover, when the coherent light beam B1 is incident to the first and second wavelength conversion areas 121 and 123, the reflective film RF can directly reflect the first converted light beam B2.

Referring to right side of FIG. 10B and FIG. 10C, in the embodiment, the optical wavelength conversion module M1 includes a reflecting area 122 and a wavelength conversion area. The wavelength conversion area includes a first wavelength conversion area 121 configured to convert a range of wavelength, where the first wavelength conversion area 121 configured to convert a part of the coherent light beam B1 into wavelength conversion beam (Yellow), and the reflecting area 122 reflects a part of the coherent light beam B1. For example, the first wavelength conversion area 121 includes a fluorescent powder layer, where color of the fluorescent powder layer included in the first wavelength conversion area 121 is yellow. In this way, when the first wavelength conversion area 121 is sequentially cut into the transmission path of the coherent light beam B1, the coherent light beam B1 is sequentially converted into the wavelength conversion beam yellow. On the other hand, in the embodiment, the optical wavelength conversion module M1 has a reflective film RF on a surface facing back to the lens set 140, and when the coherent light beam B1 is incident to the reflecting area 122, the light coherent light beam B1 is reflected by the reflecting area 122. Moreover, when the coherent light beam B1 is incident to the first wavelength conversion areas 121 and 123, the reflective film RF can directly reflect the first converted light beam B2.

In detail, referring to FIG. 9 and right side of FIG. 10B, after the coherent light beam B1 is incident to the optical wavelength conversion module M1 through the lens set 140, the reflecting area 122 and the at least one wavelength conversion area 121 is cut into the transmission path of the coherent light beam B1 in turn. In detail, when the wavelength conversion area 121 is cut into the transmission path of the coherent light beam B1, a part of the coherent light beam B1 is converted into the wavelength conversion beam R(G) by the at least one wavelength conversion area. When the reflecting area 122 is cut into the transmission path of the coherent light beam B1, the coherent light beam B1 is reflected by the reflecting area 122. Moreover, the wavelength conversion beam R(G) and the coherent light beam B1 can be correspondingly transmitted to the wavelength reflecting portion 131 and the splitting portion 133 of the first light-combining device BC1 through the lens set 140, which is described in detail below with reference of FIG. 11.

Figure 11:
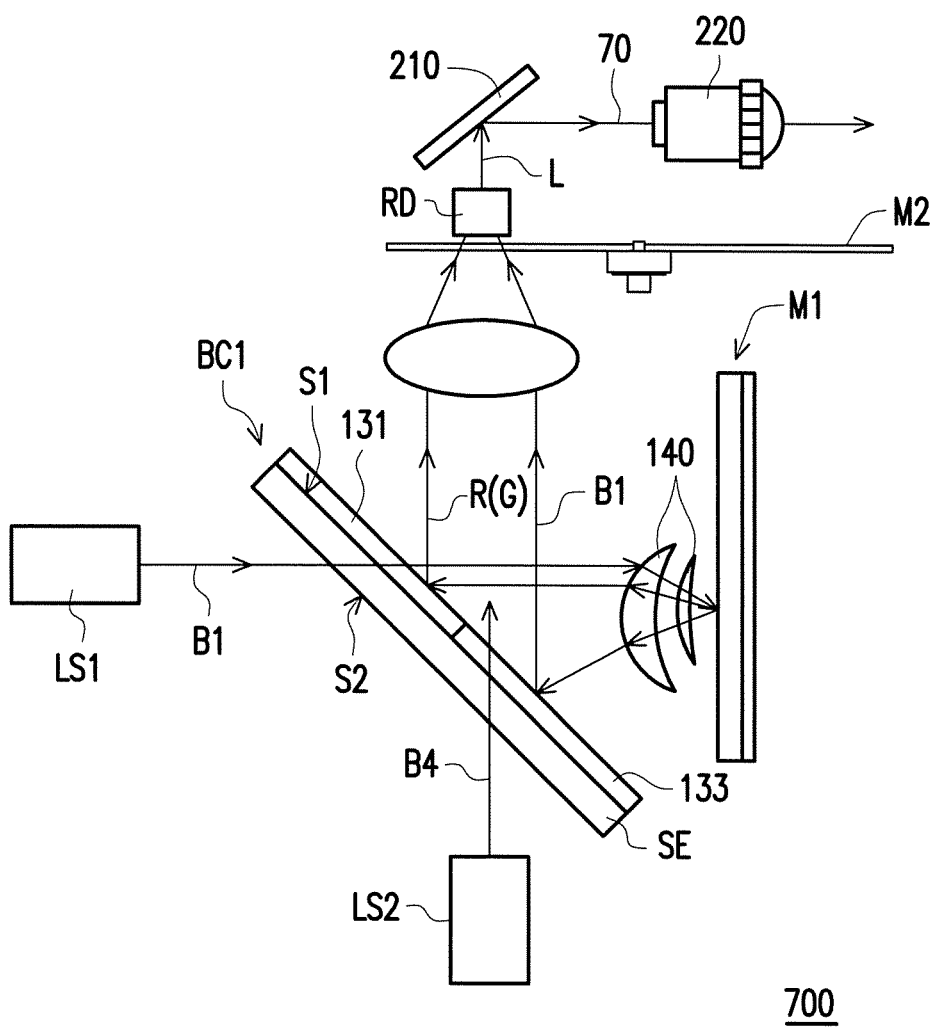
FIG. 11 is a schematic diagram of an optical path of a beam passing through the first light-combining device of FIG. 9.

FIG. 11 is a schematic diagram of an optical path of a beam passing through the first light-combining device of FIG. 9. Further, as shown in FIG. 9 and FIG. 11, in the embodiment, the first light-combining device BC1 has a substrate SE (transparent material), and the substrate SE has two surfaces S1 and S2 opposite to each other, and the wavelength reflecting portion 131 and the splitting portion 133 are located on the first surface S1. In detail, in the embodiment, as shown in FIG. 9, the first light-combining device BC1 has a normal line N2, the lens set 140 has an optical axis O, and an included angle α is formed between the normal line N2 and the optical axis O, and the included angle α ranges between 40 degree and 50 degree. In this way, by using the concave-convex lenses 141 and 143 with suitable dioptres, the wavelength conversion beams R and G and the coherent light beam B1 can be correspondingly transmitted to the wavelength reflecting portion 131 and the splitting portion 133 of the first light-combining device BC1 through the lens set 140. It should be noticed that the aforementioned value range is only used as an example, and the invention is not limited thereto.

Further, after a part of the coherent light beam B1 is reflected by the reflecting area 122 of the optical wavelength conversion module M1, the part of the coherent light beam B1 is transmitted to the splitting portion 133 of the first light-combining device BC1 through the lens set 140. Moreover, since the splitting portion 133 can reflect the blue-ray beam, the coherent light beam B1 is reflected to the light uniform device RD. On the other hand, the first light-combining device BC1 is located on the transmission path of the wavelength conversion beams R and G, and since the wavelength reflecting portion 131 can reflect the beams of the other wavelengths (for example, the red beam, the green beam, the yellow beam, etc.), the wavelength conversion beams R and G transmitted to the wavelength reflecting portion 131 are also transmitted to the light uniform device RD after reflected by the wavelength reflecting portion 131, such that the wavelength conversion beams R and G and the coherent light beam B1 are combined to form the illumination beam L.

In this way, by configuring the wavelength reflecting portion 131 and the splitting portion 133 of the first light-combining device BC1, the part of the coherent light beam B1 reflected by the optical wavelength conversion module M1 and the wavelength conversion beams R and G are combined into the illumination beam L through the first light-combining device BC1. Therefore, there is no additionally designing other optical elements or beam transmission paths required, so as to reduce a volume of the whole optical path.

It should be noticed that although a situation that the wavelength reflecting portion 131 and the wavelength reflecting portion 131 of the first light-combining device BC1 are located on the surface S1 is taken as an example for description, the invention is not limited thereto. In other embodiments, the first light-combining device BC1 may have other pattern variations, which are further described below with reference of FIG. 12.

Figure 12:
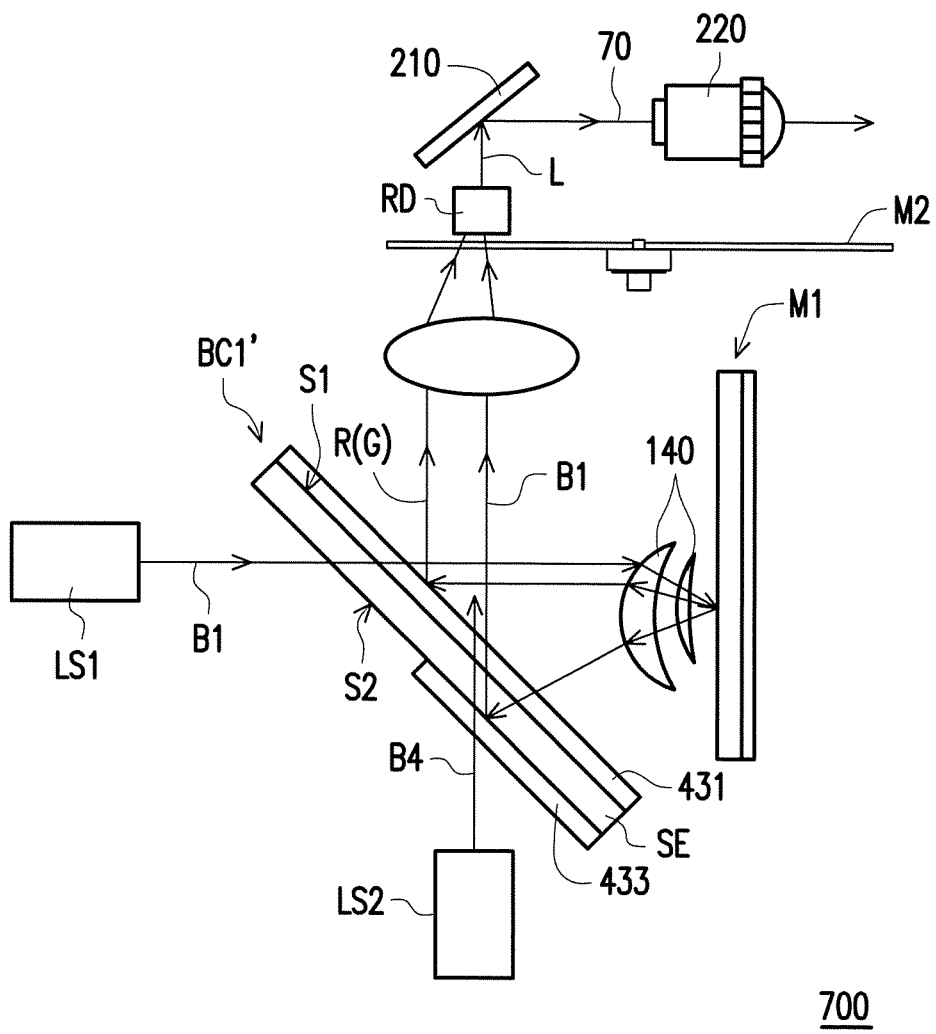
FIG. 12 is a schematic diagram of an optical path of a beam passing through another first light-combining device of FIG. 9.

FIG. 12 is a schematic diagram of an optical path of a beam passing through another first light-combining device of FIG. 9. Referring to FIG. 12, the first light-combining device BC1' of FIG. 12 is similar to the first light-combining device BC1 of FIG. 11, and differences there between are described as follows. In the embodiment, the first light-combining device BC1' has a substrate SE, and the substrate SE has two surfaces S1 and S2 opposite to each other, and the wavelength reflecting portion 431 and the splitting portion 433 are respectively located on the two surfaces S1 and S2. When a part of the coherent light beam B1 is converted into the wavelength conversion beam R(G) by the at least one wavelength conversion area 121, and a part of the coherent light beam B1 is reflected by the reflecting area 122, the wavelength conversion beam R(G) and the part of coherent light beam B1 can be correspondingly transmitted to the wavelength reflecting portion 431 and the splitting portion 433 of the first light-combining device BC1' through the lens set 140, and is transmitted to the light uniform device RD. In this way, by configuring the wavelength reflecting portion 431 and the splitting portion 433 of the first light-combining device BC1', the part of the coherent light beam B1 reflected by the optical wavelength conversion module M1 and the wavelength conversion beam R(G) is combined into the illumination beam L through the first light-combining device BC1'. Therefore, there is no additionally designing other optical elements or beam transmission paths required, so as to reduce a volume of the whole optical path. In this way, the illumination system 700 and the projection apparatus 600 achieve the aforementioned functions and effects, which are not repeated.

In view of the foregoing, the embodiments of the invention may achieve at least one of the following advantages or effects. The illumination system illustrated in the above embodiment and the projection apparatus employing the illumination system in the invention may provide enhanced purity and brightness of at least a color light beam with an arrangement of at least an auxiliary light source. In addition, since the above embodiments of the invention can enhance brightness of specific colors without adjusting a ratio between the areas in the optical wavelength conversion module, color shifts or insufficient brightness of partial color lights may be avoided.

The embodiments described hereinbefore are chosen and described in order to best explain the principles of the invention and its best mode practical application. It is not intended to be exhaustive to limit the invention to the precise form or to the exemplary embodiments disclosed. Namely, persons skilled in the art are enabled to understand the invention through various embodiments with various modifications as are suited to the particular use or implementation contemplated. It is intended that the scope of the invention be defined by the claims appended hereto and their equivalents in which all terms are meant in their broadest reasonable sense unless otherwise indicated. In addition, any of the embodiments or any of the claims of the invention does not need to achieve all of the advantages or features disclosed by the invention. Furthermore, the abstract and the headings are merely used to aid in searches of patent files and are not intended to limit the scope of the claims of the invention. Moreover, it should be known that the terminology used in the disclosure adopts "the first", "the second" and "the third" to describe each of the components, regions, layers and/or portions, but such terminology should not limit the components, regions, layers and/or portions.

What is claimed is:
1. An illumination system, comprising:
a coherent light source adapted to emit a coherent light beam;
a first light-combining device disposed on a transmission path of the coherent light beam;
an optical wavelength conversion module comprising a first wavelength conversion area, the optical wavelength conversion module disposed on the transmission path of the coherent light beam transmitted from the first light-combining device, the first light-combining device located between the coherent light source and the optical wavelength conversion module, wherein when the coherent light beam irradiates the optical wavelength conversion module, the optical wavelength conversion module converts the coherent light beam into a first converted light beam and reflects the first converted light beam back to the first light-combining device, and a wavelength of the first converted light beam is different from a wavelength of the coherent light beam;
a first auxiliary light source adapted to emit a first auxiliary light beam, a wavelength of the first auxiliary light beam is different from the wavelength of the coherent light beam, wherein the first auxiliary light beam is transmitted to the first light-combining device, and a transmitting direction of the first auxiliary light beam is different from a transmitting direction of the first converted light beam before the first auxiliary light beam and the first converted light beam are being combined; and a filtering module, adapted to filter the first converted light beam and the first auxiliary light beam to generate a first light beam, and a light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining device without being transmitted to the optical wavelength conversion module.

2. The illumination system as claimed in claim 1, wherein the optical wavelength conversion module further comprises a light passing-through area, when the coherent light beam irradiates the light passing-through area, the coherent light beam passes through the light passing-through area, the illumination system further comprises a light transmission module disposed on the transmission path of the coherent light beam passing through the optical wavelength conversion module to transmit the coherent light beam from the light passing-through area back to the first light-combining device.

3. The illumination system as claimed in claim 2, further comprising: the filtering module disposed on transmission paths of the first converted light beam, the first auxiliary light beam and the coherent light beam transmitted from the first light-combining device, the filtering module comprising a light pervious area and a first filtering area, the light pervious area cutting into the transmission path of the coherent light beam passing through the light passing-through area corresponding to the light passing-through area of the optical wavelength conversion module, and the coherent light beam passing through the light pervious area, the first filtering area corresponding to the first wavelength conversion area of the optical conversion module, the first filtering area cutting into the transmission paths of the first converted light beam and the first auxiliary light beam, wherein the first filtering area filters the first converted light beam and the first auxiliary light beam to generate the first light beam, a light wavelength spectrum range of the first light beam is narrower than a light wavelength spectrum range of the first converted light beam.

4. The illumination system as claimed in claim 2, further comprising:
a second light-combining device disposed on a transmission path of the first auxiliary light beam and the transmission path of the coherent light beam passing through the optical wavelength conversion module, and the second light-combining device disposed between the first auxiliary light source and the first light-combining device, wherein the coherent light beam from the light passing-through area is transmitted to the first light-combining device through the light transmission module and the second light-combining device, and the first auxiliary light beam is transmitted to the first light-combining device along the transmission path of the coherent light beam from the light passing-through area.

5. The illumination system as claimed in claim 4, further comprising:
a second auxiliary light source adapted to emit a second auxiliary light beam, a wavelength of the second auxiliary light beam is different from the wavelengths of the coherent light beam and the first auxiliary light beam; and a third light-combining device disposed on the transmission path of the first auxiliary light beam and a transmission path of the second auxiliary light beam, and the third light-combining device disposed between the second auxiliary light source and the first light-combining device, wherein the first auxiliary light beam from the first auxiliary light source and the second auxiliary light beam from the second auxiliary light source are transmitted to the first light-combining device through the third light-combining device and the second light-combining device, and the first auxiliary light beam and the second auxiliary light beam are transmitted to the first light-combining device along the transmission path of the coherent light beam from the light passing-through area.

6. The illumination system as claimed in claim 5, wherein the optical wavelength conversion module further comprises a second wavelength conversion area, and the light passing-through area, the first wavelength conversion area and the second wavelength conversion area cut into the transmission path of the coherent light beam in turn, when the coherent light beam irradiates the second wavelength conversion area, the second wavelength conversion area converts the coherent light beam into a second converted light beam and reflects the second converted light beam back to the first light-combining device, a wavelength of the second converted light beam is different from the wavelength of the coherent light beam, and a light wavelength spectrum range of the second auxiliary light beam is at least partially overlapped with a light wavelength spectrum range of the second converted light beam.

7. The illumination system as claimed in claim 5, wherein the second auxiliary light source is a light emitting diode or a laser diode.

8. The illumination system as claimed in claim 1, wherein the first auxiliary light beam is transmitted to the first light-combining device along the transmission path of the coherent light beam emitted from the coherent light source.

9. The illumination system as claimed in claim 1, wherein a light wavelength spectrum range of the first auxiliary light beam is at least partially overlapped with a light wavelength spectrum range of the first converted light beam, or the light wavelength spectrum range of the first auxiliary light beam is not overlapped with the light wavelength spectrum range of the first converted light beam.

10. The illumination system as claimed in claim 1, wherein the first auxiliary light source comprises at least one light emitting diode or at least one laser diode.

11. The illumination system as claimed in claim 1, further comprising:
a second auxiliary light source adapted to emit a second auxiliary light beam, a wavelength of the second auxiliary light beam is different from the wavelengths of the coherent light beam and the first auxiliary light beam, wherein the second auxiliary light beam is transmitted to the first light-combining device along the transmission path of the coherent light beam and the first auxiliary light beam, and the first light-combining device combines the first auxiliary light beam, the second auxiliary light beam and the first converted light beam reflected from the optical wavelength conversion module.

12. The illumination system as claimed in claim 1, wherein the optical wavelength conversion module comprises a reflection area, when the reflection area is cut into the transmission path of the coherent light beam, the coherent light beam reflected by the reflection area is from the optical wavelength conversion module back to the first light-combining device.

13. The illumination system as claimed in claim 12, further comprising:
a reflecting mirror, wherein the reflecting mirror and the first light-combining device are separated by a gap, and the reflecting mirror is not on the transmission path of the first auxiliary light beam.

14. The illumination system as claimed in claim 13, wherein the coherent light beam reflected by the reflection area of the optical wavelength conversion module transmits to the reflecting mirror through the first light-combining element.

15. The illumination system as claimed in claim 12, wherein the first auxiliary light source is set to be turned on during a period when the first wavelength conversion area cuts into the transmission path of the coherent light beam so that the first auxiliary light beam is combined with the first converted light beam by the first light-combining device, and the first auxiliary light source is set to be turned off during a period when the reflection area cuts into the transmission path of the coherent light beam.

16. The illumination system as claimed in claim 12, wherein the first light-combining device comprises a wavelength reflecting portion and a splitting portion, wherein the wavelength reflecting portion is pervious to the coherent light beam from the coherent light source and reflects the first converted light, and the splitting portion is pervious to the first auxiliary light beam and reflects the coherent light beam.

17. A projection apparatus, comprising:
an illumination system, comprising:
a coherent light source adapted to emit a coherent light beam;
a first light-combining device disposed on a transmission path of the coherent light beam;
an optical wavelength conversion module comprising a first wavelength conversion area, the optical wavelength conversion module disposed on the transmission path of the coherent light beam transmitted from the first light-combining device, the first light-combining device located between the coherent light source and the optical wavelength conversion module, wherein when the coherent light beam irradiates the optical wavelength conversion module, the optical wavelength conversion module converts the coherent light beam into a first converted light beam and reflects the first converted light beam back to the first light-combining device, a wavelength of the first converted light beam is different from a wavelength of the coherent light beam;
a first auxiliary light source adapted to emit a first auxiliary light beam, a wavelength of the first auxiliary light beam is different from the wavelength of the coherent light beam, wherein the first auxiliary light beam is transmitted to the first light-combining device, and a transmitting direction of the first auxiliary light beam is different from a transmitting direction of the first converted light beam before the first auxiliary light beam and the first converted light beam are being combined; and
a filtering module, adapted to filter the first converted light beam and the first auxiliary light beam to generate a first light beam, and a light wavelength spectrum range of the first converted light beam is at least partially overlapped with a light wavelength spectrum range of the first light beam, and a light wavelength spectrum range of the first auxiliary light beam is at least partially overlapped with the light wavelength spectrum range of the first light beam, wherein the first auxiliary light beam is transmitted to the filtering module through the first light-combining device without being transmitted to the optical wavelength conversion module;
a light valve disposed on a transmission path of an illumination beam from the illumination system to convert the illumination beam into an image light beam, wherein the illumination beam is formed from the first converted light beam and the first auxiliary light beam; and
a projection lens disposed on a transmission path of the image light beam.

18. The projection apparatus as claimed in claim 17, wherein the optical wavelength conversion module further comprises a light passing-through area, when the coherent light beam irradiates the light passing-through area, the coherent light beam passes through the light passing-through area, the illumination system further comprises a light transmission module disposed on the transmission path of the coherent light beam passing through the optical wavelength conversion module to transmit the coherent light beam from the light passing-through area back to the first light-combining device, the illumination beam is further formed from the coherent light beam.

19. The projection apparatus as claimed in claim 17, wherein the optical wavelength conversion module further comprises a reflection area, when the reflection area is cut into the transmission path of the coherent light beam, the coherent light beam is reflected by the reflection area from the optical wavelength conversion module back to the first light-combining device.

20. The projection apparatus as claimed in claim 19, further comprising a reflecting mirror, wherein the reflecting mirror and the first light-combining device are separated by a gap, and the reflecting mirror is not on the transmission path of the first auxiliary light beam.

21. The projection apparatus as claimed in claim 20, wherein the coherent light beam reflected by the reflection area of the optical wavelength conversion module transmits to the reflecting mirror through the first light-combining element.

22. A method for driving an illumination system, wherein the illumination system comprises a coherent light source adapted to emit a coherent light beam, a first light-combining device is disposed on a transmission path of the coherent light beam, an optical wavelength conversion module comprises a first wavelength conversion area and a reflection area, the optical wavelength conversion module being disposed on the transmission path of the coherent light beam transmitted from the first light-combining device, a first auxiliary light source is adapted to emit a first auxiliary light beam, a reflecting mirror separated from the first light-combining device by a gap and disposed not on the transmission path of the first auxiliary light beam, and a filtering module, the method comprising:
turning on the coherent light source;
turning on the first auxiliary light source during a period when the first wavelength conversion area cuts into the transmission path of the coherent light beam, wherein the first auxiliary light beam is transmitted to the filtering module through the first light-combining device without being transmitted to the optical wavelength conversion module; and turning off the first auxiliary light source during a period when the reflection area cuts into the transmission path of the coherent light beam, wherein the coherent light beam reflected by the reflection area of the optical wavelength conversion module transmits to the reflecting mirror through the first light-combining device, and the reflecting mirror reflects at least a portion of the coherent light beam reflected by the reflection area of the optical wavelength conversion module to the filtering module.

23. A method for driving an illumination system, wherein the illumination system comprises a coherent light source adapted to emit a coherent light beam, a first light-combining device disposed on a transmission path of the coherent light beam, an optical wavelength conversion module comprising a first wavelength conversion area and a reflection area, the optical wavelength conversion module being disposed on the transmission path of the coherent light beam transmitted from the first light-combining device and adapted to convert the coherent light beam into a first converted light beam and reflect the first converted light beam back to the first light-combining device, a first auxiliary light source adapted to emit a first auxiliary light beam, and a filtering module, the method comprising:

turning on the coherent light source;

turning on the first auxiliary light source during a period when the first wavelength conversion area cuts into the transmission path of the coherent light beam, wherein the first auxiliary light beam is transmitted to the filtering module through the first light-combining device without being transmitted to the optical wavelength conversion module; and turning off the first auxiliary light soure during a period when the reflection area cuts into the transmission path of the conherent light beam, wherein the first light-combining device comprises a wavelength reflecting portion and a splitting portion, the wavelength reflecting portion is pervious to the coherent light beam from the coherent light soure and reflects the first converted light beam, and the splitting portion is pervious to the first auxiliary light beam and reflects only the coherent light beam.

* * * * *